United States Patent
Walker et al.

(10) Patent No.: US 6,330,544 B1
(45) Date of Patent: Dec. 11, 2001

(54) SYSTEM AND PROCESS FOR ISSUING AND MANAGING FORCED REDEMPTION VOUCHERS HAVING ALIAS ACCOUNT NUMBERS

(75) Inventors: Jay S. Walker, Ridgefield; Sanjay K. Jindal, Wilton, both of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/263,617

(22) Filed: Mar. 5, 1999

Related U.S. Application Data

(62) Division of application No. 08/858,738, filed on May 19, 1997.

(51) Int. Cl.[7] ................................................. G06F 17/60
(52) U.S. Cl. ................................ 705/14; 705/16; 705/30; 705/35; 705/44; 235/380
(58) Field of Search ....................... 705/14, 16, 30, 705/35, 44; 235/380, 381; 364/479.01

(56) References Cited

U.S. PATENT DOCUMENTS

| | | |
|---|---|---|
| 3,594,727 | 7/1971 | Braun . |
| 3,617,638 | 11/1971 | Jochimsen et al. . |
| 3,697,693 | 10/1972 | Deschenes et al. . |
| 3,950,015 | 4/1976 | Shrock . |
| 3,985,998 | 10/1976 | Crafton ................................ 235/380 |
| 4,554,446 | * 11/1985 | Murphy ................................ 235/487 |

(List continued on next page.)

FOREIGN PATENT DOCUMENTS

| | | |
|---|---|---|
| 08260071 | * 8/1996 | (JP) . |
| WO/ 98/26376 | 6/1998 | (WO) . |

OTHER PUBLICATIONS

Minigrams, Computergram International, PP 1–4, Dec. 1992.*

(List continued on next page.)

Primary Examiner—James P. Trammell
Assistant Examiner—Mussie Tesfamariam
(74) Attorney, Agent, or Firm—Dean P. Alderucci

(57) ABSTRACT

A redemption voucher program having systems and processes for use in a credit card system. The following steps are carried about by the systems and processes and include, but are not limited to, identifying an account issued by an account issuer, generating a redemption voucher identifier corresponding to the account identifier and producing a redemption voucher including the redemption voucher identifier, distributing the redemption voucher to an account owner, and, at a merchant facility, receiving a redemption voucher from the account owner during a transaction having a specified value. Thereafter, such systems and processes take care of transmitting the redemption voucher identifier and the specified value from the merchant facility to an account number clearing authority for clearing against the account. Next, at the account issuer, the systems take care of receiving a request to authorize the redemption voucher during the transaction, identifying the account corresponding to the redemption voucher identifier, authorizing the redemption voucher, updating the account based on the transaction value, and transmitting an authorization notification from the account issuer to the account number clearing authority. Then, the systems and processes take care of receiving the authorization notification and transmitting an authorization status notification in response to the authorization notification received from the account number clearing authority to the merchant facility. Finally, at the merchant facility, the systems and processes take care of receiving the authorization status notification indicating whether the redemption voucher was cleared against the account by the account issuer, accepting the redemption voucher and ensuring that the merchant facility receives a payment from the account issuer based on the transaction.

56 Claims, 15 Drawing Sheets

U.S. PATENT DOCUMENTS

| | | | |
|---|---|---|---|
| 4,752,676 | 6/1988 | Leonard et al. | 235/379 |
| 4,997,188 | 3/1991 | Nilssen . | |
| 5,010,485 | 4/1991 | Bigari | 705/17 |
| 5,350,906 | 9/1994 | Brody et al. . | |
| 5,357,563 | 10/1994 | Hamilton et al. | 379/91.01 |
| 5,377,271 | 12/1994 | Foreman et al. | 380/51 |
| 5,399,874 | 3/1995 | Gonsalves et al. . | |
| 5,426,281 | 6/1995 | Abecassis . | |
| 5,477,047 | 12/1995 | Nakagawa et al. | 250/208.1 |
| 5,513,117 | 4/1996 | Small | 700/233 |
| 5,546,523 | 8/1996 | Gatto . | |
| 5,652,421 | 7/1997 | Veeneman et al. | 235/381 |
| 5,686,713 | 11/1997 | Rivera . | |
| 5,765,141 | 6/1998 | Spector | 705/14 |
| 5,798,508 | 8/1998 | Walker et al. | 235/380 |
| 5,864,830 * | 1/1999 | Armetta et al. | 705/41 |
| 5,870,718 | 2/1999 | Spector | 705/26 |
| 5,953,710 * | 9/1999 | Fleming | 705/38 |

OTHER PUBLICATIONS

Bond Cathy, Direct Marketing: Customer Conscious, PP 1, Mar. 1990.*

Sales Promotions, Marketing Week, P1, Mar. 1995.*

The Economist, PP 1–2, May 1996.*

Gold Steve, DIP markets Sharp PC–3000 handheld PCs in UK, PP 1, Dec. 1992.*

"New American Express Travelers Cheque Operations Center Speeds Service to Banks", The Magazine of Bank Management, Feb., 1983 Features Section at p. 48.

"Bank–Of–America; BankAmerica Expands Travelers Cheque Services", Business Wire, Jul. 6, 1987, Distribution to Business/Travel Editors.

"Treasury Proposes $ 3,000–and–over Cash ID Regulations; $ 10,000 Daily Penalty Per Violation for 'Gross Negligence' Applies", Money Laundering Alert, Alert International, Inc., Oct., 1989, Regulatory Action Section; vol. 1, No. 1; at p. 5.

Eve Tahmincioglu, "American Express Introduces Corporate Travelers Checks", U. P. I., Feb. 11, 1992, BC Cycle, Financial Section.

Phil Britt, "Travelers Checks: An Uncertain Future; Includes Related Article", Savings & Community Banker, Mar., 1995, vol. 4; No. 3; p. 31; ISSN: 10567–1757.

"Prepared Testimony of David Boyles, Senior Vice President, New Business Ventures, Stored Value Group, Smart Card Center of Excellence, American Express Travel Related Services, Inc., Before The House Banking and Financial Services Committee, Domestic And International Monetary Policy Subcommittee", Federal News Service, Jun. 11, 1996.

"American Express Continues Innovative Support of Citymeals–on–wheels", PR Newswire, Oct. 30, 1987.

Brenda Fine, "Be My Guest", The National Law Journal, Apr. 24, 1989 Change of Venue Section at p. 29.

"American Express Unveils Marketing Programs to Boost Traffic in the Restaurant Industry", PR Newswire, May 20, 1991.

Peter O. Keegan, "Charge! Amex Sets Out to Lure Back Diners; Credit Card Giant Unveils New Marketing Program During 72nd NRA Show . . . " Nation's Restaurant News, Jun. 3, 1991.

Bill Carlino, "AMEX Dispute Reaches Canada; Operators Promote Other Cards in Effort to Force AMEX Rate Cuts", Nation's Restaurant News, Jul. 22, 1991.

PCT Written Opinion for Application No. PCT/US97/22564, dated Nov. 12, 1998.

* cited by examiner

| CUSTOMER ACCOUNT NUMBER | NAME | ADDRESS | PHONE NUMBER | ORIGINAL CREDIT LINE | AVAILABLE CREDIT LINE | CREDIT RATING |
|---|---|---|---|---|---|---|
| 2222-3333-4444-5555 | TONY CARDHOLDER | 99 MAIN ST., HOMETOWN, CT, 22222 | (333) 444-5555 | $2000 | $1233 | B |
| 2222-8888-7777-6666 | SUE MARVIN | 10 CENTER ST., ROCKPORT, NJ, 99999 | (999) 111-2222 | $3500 | $500 | A |

R1 → (row 1)
R2 → (row 2)

| | CUSTOMER ACCOUNT NUMBER | CERTIFICATE NUMBER | MAXIMUM VALUE | STATUS |
|---|---|---|---|---|
| R1→ | 2222-3333-4444-5555 | 2222-XXXX-XXXX-XXXX | $50.00 | REDEEMED |
| R2→ | 2222-8888-7777-6666 | 2222-XXXX-XXXX-9999 | $100.00 | ISSUED |
| R3→ | 2222-8888-7777-6666 | 2222-1111-1111-1111 | $50.00 | REDEEMED |

| ACCOUNT NUMBER | DATE | TIME | TRANSACTION ID NUMBER | AUTHORIZATION CODE | TRANSACTION AMOUNT |
|---|---|---|---|---|---|
| 2222-3333-4444-5555 | 4/15/97 | 11:00 AM | 2222-XXXX-XXXX-XXXX | 2239 | $47.59 |
| 2222-3434-5656-7878 | 4/15/97 | 12:30 PM | 2222-9898-2345-5473 | 7685 | $98.69 |

R1 → (first data row)
R2 → (second data row)

| MERCHANT ID NUMBER | DATE | TIME | ACCOUNT NUMBER | TRANSACTION AMOUNT | TRANSACTION ID NUMBER | AUTHORIZATION NUMBER |
|---|---|---|---|---|---|---|
| 454838 | 4/15/97 | 11:00AM | 2222-3333-4444-5555 | $47.59 | 2222-XXXX-XXXX-XXXX | 2239 |
| 879566 | 4/15/97 | 12:30PM | 2222-9898-2345-5473 | $98.69 | 2222-9898-2345-5473 | 456789 |

R1 → (row 1)
R2 → (row 2)

SYSTEM AND PROCESS FOR ISSUING AND MANAGING FORCED REDEMPTION VOUCHERS HAVING ALIAS ACCOUNT NUMBERS

CROSS-REFERENCE TO RELATED APPLICATIONS

This application is a divisional of U.S. patent application Ser. No. 08/858,738 entitled "SYSTEM AND PROCESS FOR ISSUING AND MANAGING FORCED REDEMPTION VOUCHERS HAVING ALIAS ACCOUNT NUMBERS" filed in the name of Jay S. Walker and Sanjay K. Jindal on May 19, 1997.

BACKGROUND OF THE INVENTION

1. Field of the Invention

The present invention relates to the field of redemption vouchers and, more particularly, to redemption vouchers such as gift certificates that may be issued and used in conjunction with credit cards.

2. Description of the Related Art

It is well known that credit card issuers have used various programs based on credit card add-ons to motivate card holders to use their credit card accounts to purchase goods and services. At the same time, others have benefitted from the issuance and promotion of alternate forms of payment such as gift certificates to provide customers with purchasing flexibility and to promote purchasing in certain establishments. To date, however, credit card gift certificate add-ons or programs have been quite few and limited in use. As is described in detail below, such programs would allow credit card companies to provide card holders with benefits including greater gift giving abilities while allowing credit card issuers to increase credit card use.

The existence and use of store-type or specific-use gift certificates is well known. Typically, such a gift certificate is issued by a store (or group of stores under common ownership) in certain face value amounts. The consumer pays for the gift certificate in advance and then gives the certificate to a recipient. The recipient redeems the certificate at the store at a subsequent time. If the certificate is lost, stolen, or simply left unused, then the value of the certificate is captured in full by the issuing store (since it was paid for in full in advance). If a customer purchases something of lower value than the value of the gift certificate, the difference is usually paid to the buyer in the form of a store credit or cash. If the purchase is for more than the value of the gift certificate, the buyer makes up the difference in cash.

Some malls offer mall-wide gift certificates which can be used at any store in a particular mall. Typically, these certificates are standard commercial checks with the mall checking account number printed thereon. Usually, any store in the mall accepts the gift certificate because it can be deposited in the same manner as a personal check. Typically, the mall takes the money from customers and places such funds in a checking account to "back-up" or cover the gift certificate check.

Credit card companies have offered a few, limited use programs combining credit cards with gift certificates. These include the AMERICAN EXPRESS GIFT CHECK program, the AMERICAN EXPRESS "BE MY GUEST" program, loan checks, reward programs, and convenience checks.

The AMERICAN EXPRESS GIFT CHECK program allowed card holders to purchase so-called pre-paid gift checks in certain specified denominations by either paying for them in cash or some equivalent or by charging them to their AMERICAN EXPRESS accounts. Once paid for and issued to a card holder, the card holder was able to give a gift check to a recipient who, in turn, could redeem the gift check wherever AMERICAN EXPRESS traveler's checks were accepted. Unlike credit cards, however, gift checks issued by AMERICAN EXPRESS clear like conventional traveler's checks. And, like the gift certificates mentioned above, gift checks bear a face value that is specified by the customer who purchased the gift checks at the time of purchase, are paid for in advance of their redemption, and clear as traveler's checks and not as credit card charges.

The AMERICAN EXPRESS "BE MY GUEST" program, unlike the gift check program mentioned above, is one that involves a variable-value gift certificate known as a "BE MY GUEST" certificate. This gift certificate entitled a recipient to a dinner at a participating restaurant at a card holder's expense. The certificate is accompanied by a pre-filled out AMERICAN EXPRESS charge slip with a designated value and with the card holder's credit card account number. The card holder must obtain the certificate from AMERICAN EXPRESS credit cards by expressly requesting the same and is charged the full designated value when the certificate is used or presented to a participating restaurant. The use of such BE MY GUEST certificates are limited to particular restaurants that accept AMERICAN EXPRESS credit cards. The problem with this type of a gift certificate is that the gift recipient can see the giver's AMERICAN EXPRESS account number. This "security problem" is a general shortcoming of most credit card "linked" instruments.

In addition to the gift checks and the BE MY GUEST certificates discussed above, some credit card companies have issued "forced" loan checks. Such loan checks may be distributed to credit card customers through the mail on an unsolicited basis. They may also be included as inserts or attachments in customers' monthly billing statements. The checks often have face values or amounts up to thousands of dollars and are typically made payable to the account holder. These checks are generally intended to be deposited by a credit card customer in his or her personal bank account. As loan checks typically are made payable to the credit card holder, they act as instant loans or cash advances that later appear as charges on the credit card customer's account or monthly billing statement. The credit card customer is liable for the value of a particular check should he first choose to endorse the check to make it negotiable and then to cash it with or present it to his banking institution. If the credit card customer desires, he may simply destroy or discard the check and bear no liability. Often, unsolicited loan checks bear the credit card issuer's bank account number and the credit card customer's credit card account number. As loan checks are typically deposited in card holder bank accounts or in pre-designated accounts, loan checks may not be given as gifts to others.

In addition to checks and other certificates known to be issued to credit card customers, other credit card issuers have instituted reward programs of the type illustrated by the General Electric Company's GE Rewards Visa Credit Card program. That program allows a credit card customer to automatically receive $5 rebate certificates for every incremental level of charging he or she does (e.g., for every $100 in charging, the credit card holder would receive a $5 rebate certificate). The rebate certificates are automatically included in the credit card customer's monthly billing statement in the form of laser printed (lasered) vouchers which may include the card holder's account number and which may be tendered by the card holder at previously selected retail merchants whose names are pre-printed on the vouchers. Although, GE's reward program provides credit card customers with cash-off discounts, the available outlets where such rebate certificates can be used is limited.

To provide greater flexibility to card holders, credit card issuers have issued convenience checks. Such convenience checks are well known. These checks carry indicia linking the check to a customer's credit card account and can be used by the card holder as payment in the same manner as normal personal checks. The difference between convenience checks and regular personal checks is that the former are treated as cash advances against a card holder's available credit line on his credit card instead of being deducted from money on deposit in a checking account. Large numbers of convenience checks are regularly mailed by banks and card issuers as ways to promote the creation of additional consumer charge volume and encourage consumers to build up credit card balances. Moreover, convenience checks also are used to encourage card holders to pay off and transfer balances from other credit cards they might hold.

Accordingly, the credit card add-ons and programs described above illustrate the lack of a general use gift certificate type instrument. Applicant has recognized that such a lack of a general purpose gift certificate presents an opportunity to the credit card industry and to credit card holders. That opportunity involves combining the benefits of a gift certificate type instrument with the benefits of a credit card. That combination would result in many benefits not heretofore realized by other credit card add-on programs. For example, the combination of a gift certificate with a credit card account could result in a program wherein gift certificates are not paid for until after they are presented for redemption by a recipient thereby allowing a credit card holder to defer payment of a gift for an intended recipient. Moreover, such a combination could allow a credit card holder to receive gift certificates at his home via mail or other service since such certificates would be issued by a credit card issuer without requiring the card holder to visit a particular store or facility. Moreover, by linking the credit card and a gift certificate, the gift certificate could be processed via the credit card processing systems thereby enabling the gift certificate to be accepted anywhere credit cards are accepted. Such wide acceptance of credit card based gift certificates could allow a gift certificate to be issued by a credit card issuer and be made payable to any particular merchant or be left blank for a credit card customer to specify a particular merchant. Also, since the gift certificate and a credit card could be combined, a credit card issuer could either specify a maximum charge amount which may or may not be evident to the gift recipient or leave the same blank to allow the credit card holder to specify his own amount that he or she feels comfortable giving to an intended recipient. Moreover, a combination of a gift certificate and a credit card could allow a card holder to specify an expiration date to be associated with a gift certificate thereby allowing the credit card holder to control the use of his credit card. Additionally, such a combined system could allow a card holder to specify gift denominations different from standard dollar amounts or dollar maximums thereby allowing the card holder to issue an unlimited type gift capped only by the card holder's available credit.

In addition to the benefits mentioned above, a system combining gift certificates with credit card accounts would allow credit card issuers to realize increased credit card use as card holders would have greater spending and card use abilities. Such card usage abilities could be offered in the context of an add-on program wherein service fees may be charged for activation of gift certificates, cancellation of gift certificates, and processing of gift certificates. Accordingly, credit card issuers would, in turn, realize new and additional revenue streams and increased good will associated with providing greater card member benefits.

SUMMARY OF THE INVENTION

In view of the aforementioned discussion of the related art, the primary object of the present invention is to combine gift certificates or redemption vouchers with credit card processing systems to achieve the benefits mentioned above.

It is therefore another object of the present invention to provide a system and a corresponding process for issuing redemption vouchers that may be used in conjunction with credit card accounts in a secure, safe manner.

It is a further object of the present invention to provide a system and a corresponding process for allowing credit card issuers to authorize the use of issued redemption vouchers.

It is still a further object of the present invention to provide a system and a corresponding process for allowing merchants to accept and benefit from redemption vouchers issued by credit card issuers.

It is yet another object of the present invention to provide a system and a corresponding process for allowing credit card owners to obtain and benefit from redemption vouchers that may be used at designated merchants or at any outlet of goods and services.

These and other objects of the present invention are achieved by providing a process for issuing a redemption voucher including the steps of identifying an account having an account owner and an account identifier within a data processing system, generating a redemption voucher identifier corresponding to the account identifier, producing a redemption voucher including the redemption voucher identifier, and distributing the redemption voucher to the account owner. The redemption voucher becomes useable when it is activated by the account owner within the data processing system prior to redemption.

The present invention also provides a process for issuing a redemption voucher including the steps of identifying an account having an account owner and an account identifier, generating a redemption voucher identifier corresponding to the account identifier, producing a redemption voucher including the redemption voucher identifier, and distributing the redemption voucher to the account owner at which time the redemption voucher becomes immediately negotiable upon receipt by the account owner.

Additionally, the present invention provides a system for issuing a redemption voucher to an account owner including a data processing sub-system maintaining a database of information related to an account having an account identifier and an account owner and generating a redemption voucher identifier corresponding to the account identifier. Also included is a production sub-system producing a redemption voucher including the redemption voucher identifier. Also included is a distribution sub-system distributing the redemption voucher to the account owner. The redemption voucher is immediately negotiable upon receipt by the account owner.

The present invention also provides a system for issuing a redemption voucher to an account owner that includes a data processing sub-system maintaining a database of information related to an account having an account identifier and an account owner and generating a redemption voucher identifier corresponding to the account identifier. The system also includes a production sub-system producing a redemption voucher including the redemption voucher identifier. The redemption voucher is adapted to be activated within the data processing system by the account owner prior to redemption of the redemption voucher. Also included is a distribution sub-system distributing the redemption voucher to the account owner.

Also, the present invention provides a process for authorizing a redemption voucher adapted for use in a credit card processing system. The process includes the steps of receiving a request to authorize a redemption voucher during a transaction having a specified value. The redemption voucher includes a redemption voucher identifier. The request includes a notification of the redemption voucher identifier and a notification of the specified value. Additionally, the process involves identifying an account having an account identifier corresponding to the redemption voucher identifier, authorizing the redemption voucher; and updating the account based on the specified value.

The present invention also provides a process for redeeming redemption vouchers adapted for use within a credit card transaction processing system that includes the steps of receiving a redemption voucher during a transaction having a specified value. The redemption voucher includes a redemption voucher identifier corresponding to an account having an account identifier issued by an account issuer. The process further includes the steps of transmitting the redemption voucher identifier to an account number clearing authority for clearing the redemption voucher against the account, receiving from the clearing authority an authorization status notification indicating whether the redemption voucher was cleared against the account, accepting the redemption voucher when the status notification indicates that the redemption voucher was cleared by the clearing authority, and receiving a payment based on the specified value from the account issuer.

The present invention also provides a process for obtaining a redemption voucher from an account issuer adapted for use in a credit card system that includes the steps of establishing an account with an account issuer. The account has an account identifier. Additionally, the process includes the step of receiving a redemption voucher issued by the account issuer. The redemption voucher includes a redemption voucher identifier corresponding to the account identifier. The redemption voucher is negotiable immediately upon receipt.

Additionally, the present invention provides a process for obtaining a redemption voucher from an account issuer adapted for use in a credit card system that includes the steps of establishing an account with an account issuer having an activation system. The account has an account identifier. The process further includes the step of receiving a redemption voucher issued by the account issuer. The redemption voucher includes a redemption voucher identifier corresponding to the account identifier. The process also includes the step of activating the redemption voucher within the activation system.

Finally, the present invention provides and enables a credit card based redemption voucher program having the systems and processes summarily described above and which are exemplified in detail below.

BRIEF DESCRIPTION OF THE DRAWINGS

The present invention is described in detail below with reference to the following drawing figures of which:

FIG. 4 is a diagram depicting the credit card holder account database illustrated in FIG. 2;

FIG. 5 is a diagram depicting the certificates database illustrated in FIG. 2;

FIG. 6 is a diagram depicting the credit card issuer's transaction database illustrated in FIG. 2;

FIG. 7 is a diagram depicting the credit card processor's transaction database illustrated in FIG. 2;

DETAILED DESCRIPTION OF THE PREFERRED EMBODIMENTS

Figure 1:
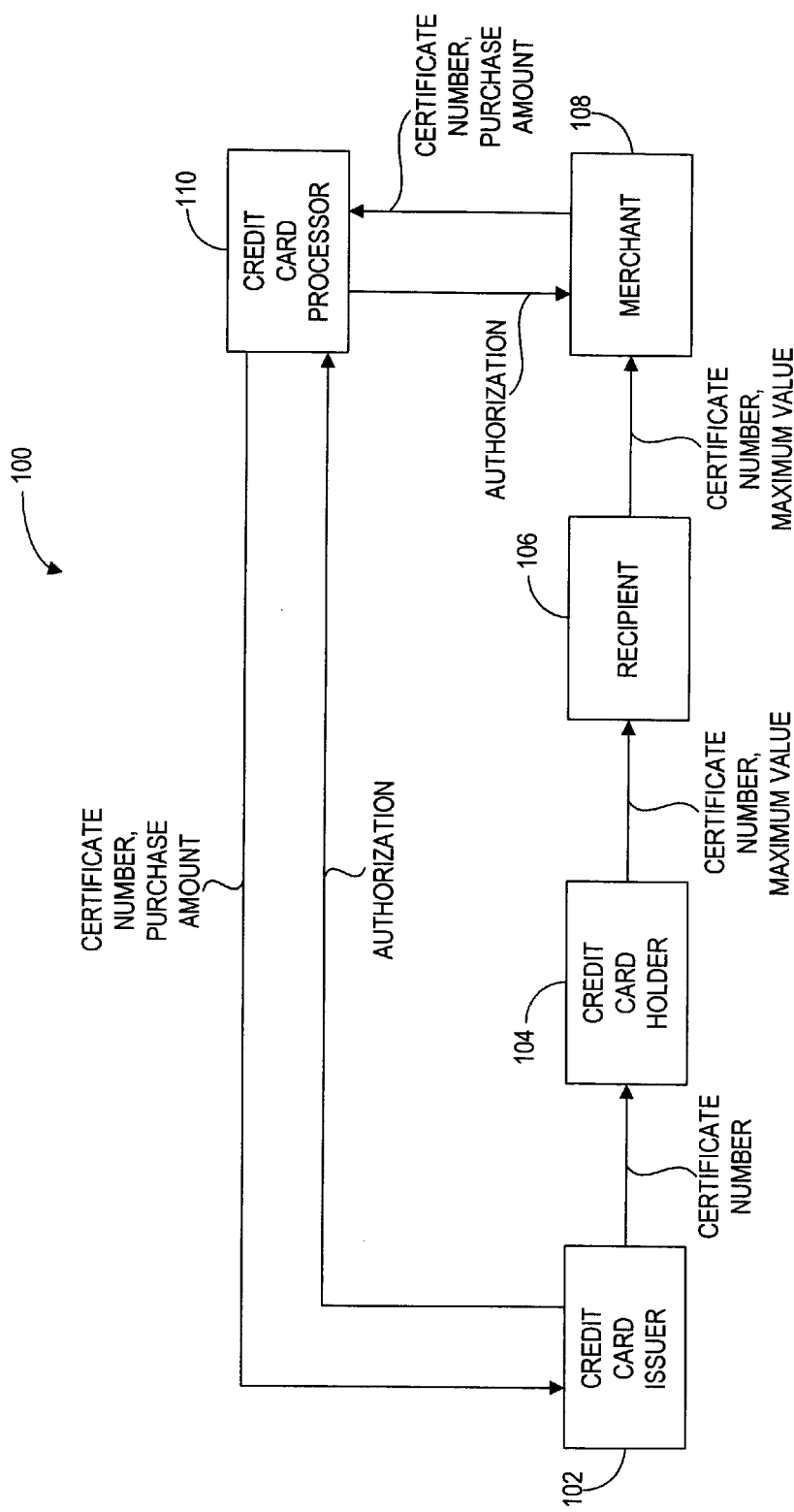
FIG. 1 is a block system diagram of a redemption voucher processing system according to a first embodiment of the present invention.

The present invention is described in detail below with regard to the drawing figures briefly described above. Like parts are referred to by like reference numerals.

Referring now to FIG. 1, therein depicted is a block system diagram of a redemption voucher processing system according to a first embodiment of the present invention. FIG. 1 illustrates how redemption vouchers are issued by a credit card issuer and how data and information about such vouchers flows within a credit card processing environment wherein patrons and merchants exchange money for goods and services on a regular basis.

As used herein, the term "redemption voucher" means a printed item or other object having an inherent value derived from an underlying account accessible through a credit card clearing system. In the preferred embodiment of the invention the redemption voucher is related to the account through an alias account number useable by the clearing system to identify and place a charge against the underlying account. The redemption voucher may, for example, take the form of a custom-printed gift certificate, or a limited use credit-card having thereon an alias account number useable to access and charge a credit card account.

The term "account" as used herein means any account that may be identified and conventionally acted upon (ie.

debited, credited, etc.) through a conventional credit card process. Such accounts include, for example, credit and debit card accounts. A conventional credit card processor includes, for example, First Data Corp. and/or any other commercial clearinghouse for credit card transactions.

In particular, redemption voucher processing system 100 includes and involves a credit card issuer 102, a credit card holder (e.g., a credit card account owner) 104, a recipient 106, a merchant 108, and a credit card processor or clearing house 110. Credit card issuer 102 may be a bank or any entity involved in the issuance and maintenance of sub-systems necessary to support credit card type transactions. Credit card issuer 102 produces (e.g., prints), folds, and issues a redemption voucher (indicated at the arrow connecting credit card issuer box 102 to credit card holder box 104) to credit card holder 104 via a mail service such as the U.S. Mail as an attachment or insert material that may be submitted to credit card holder 104 in an envelope containing credit card holder 104's monthly billing statement. Accordingly, credit card issuer 102 would have to have the sub-systems necessary to prepare redemption vouchers (e.g., gift certificates) which could include printers, folding equipment, envelope stuffing equipment, etc. Of course, credit card issuer 102 may outsource such services and need not actually maintain such sub-systems. In any case, the redemption voucher submitted to credit card holder 104 preferably is a paper form made to appear important and valuable (i.e., printed in gift certificate style) and will include as printed material a certificate number and, possibly, other important information such as redemption value, etc. For a discussion of the appearance of a redemption voucher in the form of a gift certificate, see FIG. 8, below.

Although credit card issuer 102 or some outsourced enterprise is suited to print and distribute redemption vouchers, it should be noted that the present embodiment and invention could be modified to allow a credit card customer such as card holder 104 to operate an on-line service such as one operating on the Internet via the world-wide-web (WWW) (e.g., the MicroSoft Network MSN) to retrieve redemption vouchers. In such a case, card holder 104 could visit a web site via his browser and electronically receive redemption vouchers from that web site for later printing on a printer device such as on a color ink jet printer manufactured by HEWLETT PACKARD. Of course, a self-printed redemption voucher could be made to appear fancy and important in a desired fashion. The reception of images and text via an on-line service and the printing of the same from within a browser or some other dedicated user interface browsing tool (e.g., AMERICA ONLINE) will be readily apparent to those skilled in the art of network-based computing. Accordingly, it should be clear that the present invention provides for remote printing of redemption vouchers.

As noted above, the redemption voucher issued by credit card issuer 102 includes a redemption voucher identifier that corresponds to but does not visually identify credit card holder 104's credit card account number. To illustrate this point, consider a credit card number and a redemption voucher identifier as two sets of sixteen numbers each (of course, alpha numeric strings are also possible). Sixteen digits are typically used to constitute industry common account numbers. The set of numbers comprising the credit card number will be visually different from the set of numbers comprising the redemption voucher identifier. For example, a credit card number may be "1234-5678-9012-3456" and a corresponding redemption voucher identifier may be "1234-9999-9999-9999"). In the preceding example, the credit card number and the redemption voucher identifier are visually different. It is important to note, however, that in the preceding example, the first four digits of both sets of numbers is "1234." The number or sub-set 1234 indicates a banking institution and can in no way identify a particular credit card account. It is preferable to have the last twelve digits of any redemption voucher identifier be visually different from any twelve digit sub-set of digits of a linked credit card account number. Thus, correspondence for purposes of the present embodiment and invention generally, implies that the last twelve digits of a redemption voucher identifier will be visually different from the last twelve digits of the credit card account number to which the redemption voucher identifier is linked. Of course, it is preferable to have the visual and actual difference be substantial or complete as the greater the difference the greater the "alias" nature and the less likely that unwanted eyes could decipher a particular account number. Truly random number and digit sets and sequences are preferred as statistically they will provide the greatest visual differences.

Accordingly, the redemption voucher identifier is an alias number or identifier that corresponds and links or maps to credit card holder 104's account number. Since the redemption voucher identifier resembles a credit card account number (e.g., the same number of digits, etc.), but is in fact, not a credit card account number, the redemption voucher may be tendered and redeemed anywhere the credit card issuer's cards are accepted as the redemption voucher is processed as a credit card transaction. Further discussion about the nature of the redemption voucher identifier and its correspondence to a credit card account number appears throughout the remainder of this patent document. As noted above, FIG. 8 (discussed below), graphically depicts a redemption voucher in the form of a gift certificate that includes a redemption voucher identifier in the form of a gift certificate number. Finally, it is the alias nature of the redemption voucher identifier that allows credit card holder 104 to distribute the redemption voucher without fear of fraudulent use that heretofore often occurred from distributing or openly using one's credit card account number.

In this embodiment, the redemption voucher that is issued by credit card issuer 102 to card holder 104 is a bearer instrument (e.g., a bearer gift certificate) which often is called a "bearer paper." By definition, a bearer paper is an instrument (e.g., commercial paper) that is negotiable upon delivery by any party in possession of the instrument. See Baron's Law Dictionary, Second Edition, Copyright© 1984. Of course, a "negotiable" instrument is one that must be a written document, signed by the maker (e.g., a credit card issuer), that contains an unconditional promise to pay a sum certain in money to a specified legal person or bearer. If a gift certificate, for example, is presented as "negotiable immediately upon receipt," that gift certificate may be presented to a third party as tender without any need for special endorsement prior to tender. Accordingly, the redemption voucher that is issued by credit card issuer 102 to card holder 104 is a bearer type redemption voucher or one that is negotiable upon receipt by any party that takes possession of the redemption voucher such as by recipient 106 as described below. Of course, it should be noted that card holder 104 may be considered as the ultimate recipient of the redemption voucher; the structure and corresponding operation of the same depicted in FIG. 1, are not meant to limit the present invention and are merely exemplary of the types of arrangements possible as a result of the present invention.

In addition to the bearer nature of the redemption voucher of this first embodiment, the redemption voucher issued to card holder 104 is one that is submitted in an unsolicited manner; that is, the submission of the redemption voucher is "forced" to card holder 104 regardless of whether card holder 104 requested the same. In this way, a credit card holder retention program may be established whereby a credit card holder such as credit card holder 104 will be less likely to switch or cancel his card if he has provided gift certificates to friends and others who have not redeemed the same at the point in time that card holder 104 desires to cancel his account.

After review of the redemption voucher submitted to card holder 104 and, possibly, after some completion of the same by card holder 104 (e.g., the insertion of a message or a maximum dollar amount or a store/merchant designator), card holder 104 may then may pass the redemption voucher to recipient 106 at card holder 104's discretion. In this way, the redemption voucher may form the basis of a gift from card holder 104 to recipient 106. Recipient 106 can then present the redemption voucher (which has a pre-printed redemption voucher identifier and, possibly, a maximum value supplied by card holder 104) to merchant 108.

Merchant 108, once presented with the redemption voucher from recipient 106, can accept the same as payment for goods and/or services that merchant 108 sells. If merchant 108 decides to accept the redemption voucher, he will determine if the pre-printed face value and/or card holder 104 supplied maximum value is sufficient to cover the costs involved in the particular purchase transaction. If the maximum value is sufficient, only the purchase amount will ultimately be debited to card holder 104's account. If the maximum value is not sufficient to cover the purchase amount, merchant 108 will ask recipient 106 to make up the difference in cash or via some other payment means. In either case, after merchant 108 has determined to accept the redemption voucher he will proceed to have the same authorized by the credit card issuer and, in the case of FIG. 1, via an intermediary credit card processor organization or clearing house 110.

Merchant 108 will supply pertinent information about the transaction and the redemption voucher to credit card processor 110. Such information will include the redemption voucher identifier or certificate number (i.e., which identifier resembles a credit card account number in terms of the number of digits (16), initial four digit bank identifier, etc.) and the purchase amount (e.g., a dollar amount). Such information may be transmitted to credit card processor via a credit card point of sale terminal (POS) such as one manufactured and distributed by VERIFONE. Thereafter the information transmitted by merchant 108 to credit card processor 110 is further transmitted (e.g., via telecommunications links) to credit card issuer 102 for ultimate authorization. In addition to engaging in a conventional authorization process, credit card issuer 102 will engage in an additional process to identify and map the redemption voucher identifier to the appropriate credit card account that corresponds to credit card holder 104's account number. Further details about the authorization process conducted by credit card issuer 102 is discussed in detail below with regard to FIG. 2.

Once credit card issuer 102 has conducted its authorization process to determine, among other things, if available credit remains on credit card holder 104's account to cover the purchase intended by recipient 106, credit card issuer 102 will issue an authorization status notification to credit processor 110. That authorization status notification either will indicate that the transaction was authorized or that the transaction was declined. In either case, credit card processor 110 will receive the authorization status notification from credit card issuer 102 and will transmit a corresponding authorization status message to merchant 108. If that message indicates a positive authorization or approval code the same will most likely appear on merchant 108's POS terminal thereby indicating that merchant 108 may accept the redemption voucher which has been tendered as payment in the context of the transaction. Thereafter, the transaction will be concluded and recipient 106 will be sent on his or her way.

Figure 2:
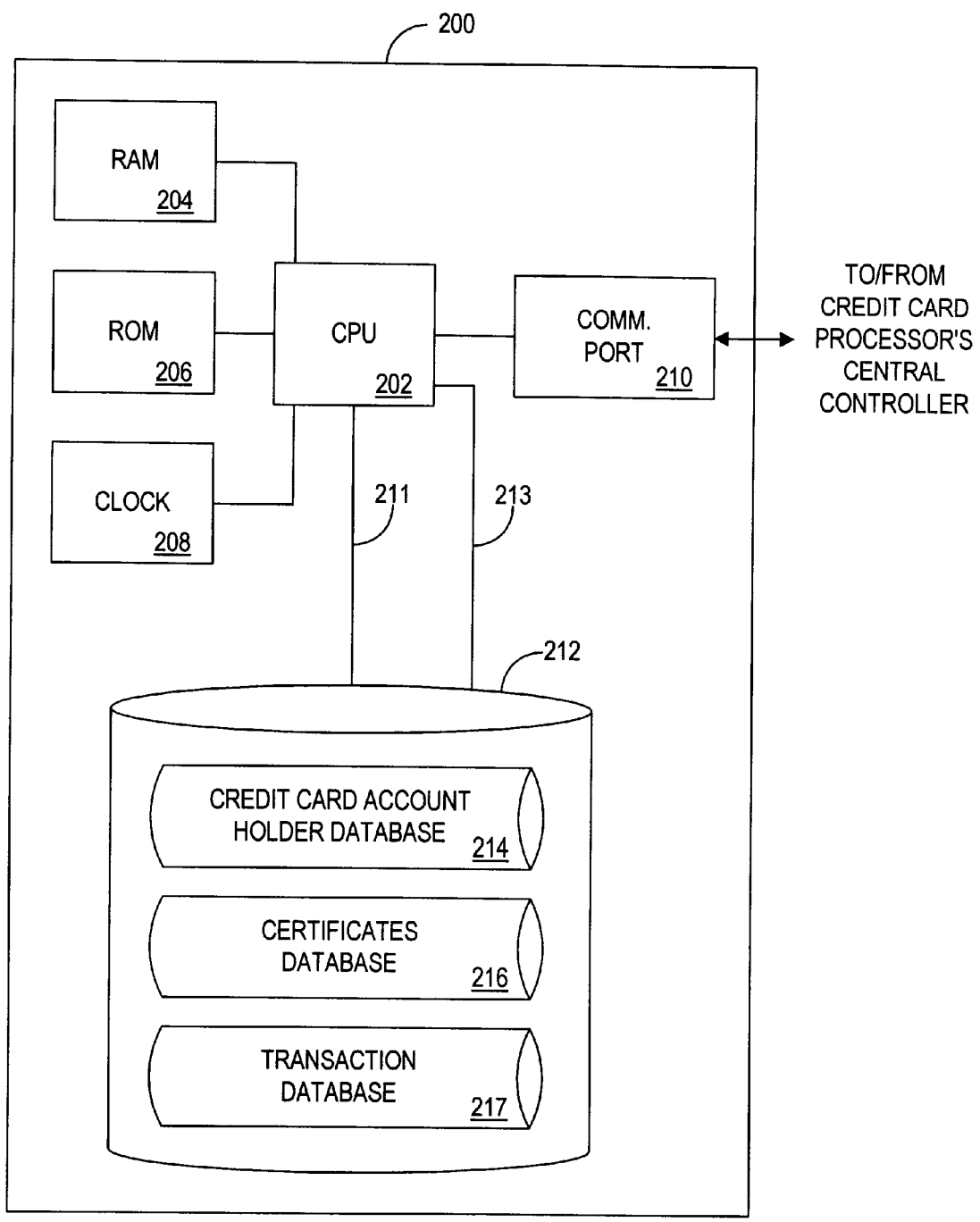
FIG. 2 is a block system diagram of a credit card issuer's data processing system.

Referring now to FIG. 2, therein depicted is a block system diagram of credit card issuer 102's data processing system (also known as an "automatic data processing system" or a "computer system"). In particular, data processing system 200 includes a computer system having a CPU 202, a RAM 204, a ROM 206, a CLOCK 208, a communications processor and port device 210 (hereinafter abbreviated as "COMM PORT 210"), and a data storage device 212 maintaining a database comprised of a credit card account holder database 214, a certificates database 216, and a transaction database 217. Additionally, the aforementioned components are operatively coupled in a conventional way via couplings 211 and 213. Couplings 211 and 213 may be a bus architecture, a network architecture or any other topology that allows high-speed data communications between a CPU and a data storage device 212 which may be a fast disk-based data storage device which are well known in the computer industry.

Data processing system 200 is depicted as a general purpose computer system such as one manufactured by SUN Microsystems known in the industry as the SUN SPARC processor (e.g., a SPARC 1000 running SUN SOLARIS). The database management system software "DBMS" is preferably implemented in a relational database environment such as one produced by ORACLE Corp. known in the industry as the ORACLE 7 relational database management system.

The use and operation of the component parts of data processing system 200 including the use and operation of CPU 202, RAM 204, ROM 206, CLOCK 208, COMM PORT 210, couplings 211 and 213, and data storage device 212 will be readily apparent to those skilled in the field of computers and the like.

The interconnections of the component parts making up data processing system 200 will be readily known in the art of computer system design and implementation. Moreover the use of a DBMS like ORACLE 7, including the maintenance, querying, and manipulation of databases and corresponding tables related to a system such as ORACLE 7, will be as readily understood by those skilled in the art of database management technologies.

The actual DBMS structure of the databases forming the bases of relevant tables utilized in the context of the present invention (i.e., tables 214, 216, and 217) will be discussed in detail below with regard to FIGS. 4, 5, and 6.

It should be noted that COMM PORT 210 is configured to communicate via telecommunications links to a credit card processor such as credit card processor 110 as depicted in FIG. 1. Electronic communications in the form of data communications will be readily apparent to those skilled in the art. Of course, it should be noted that COMM PORT 210 could be configured to communicate via a networking topology in an open-standards arrangement or in a closed intra-net environment utilizing conventional networking protocols such as TCP/IP and the like.

Figure 3:
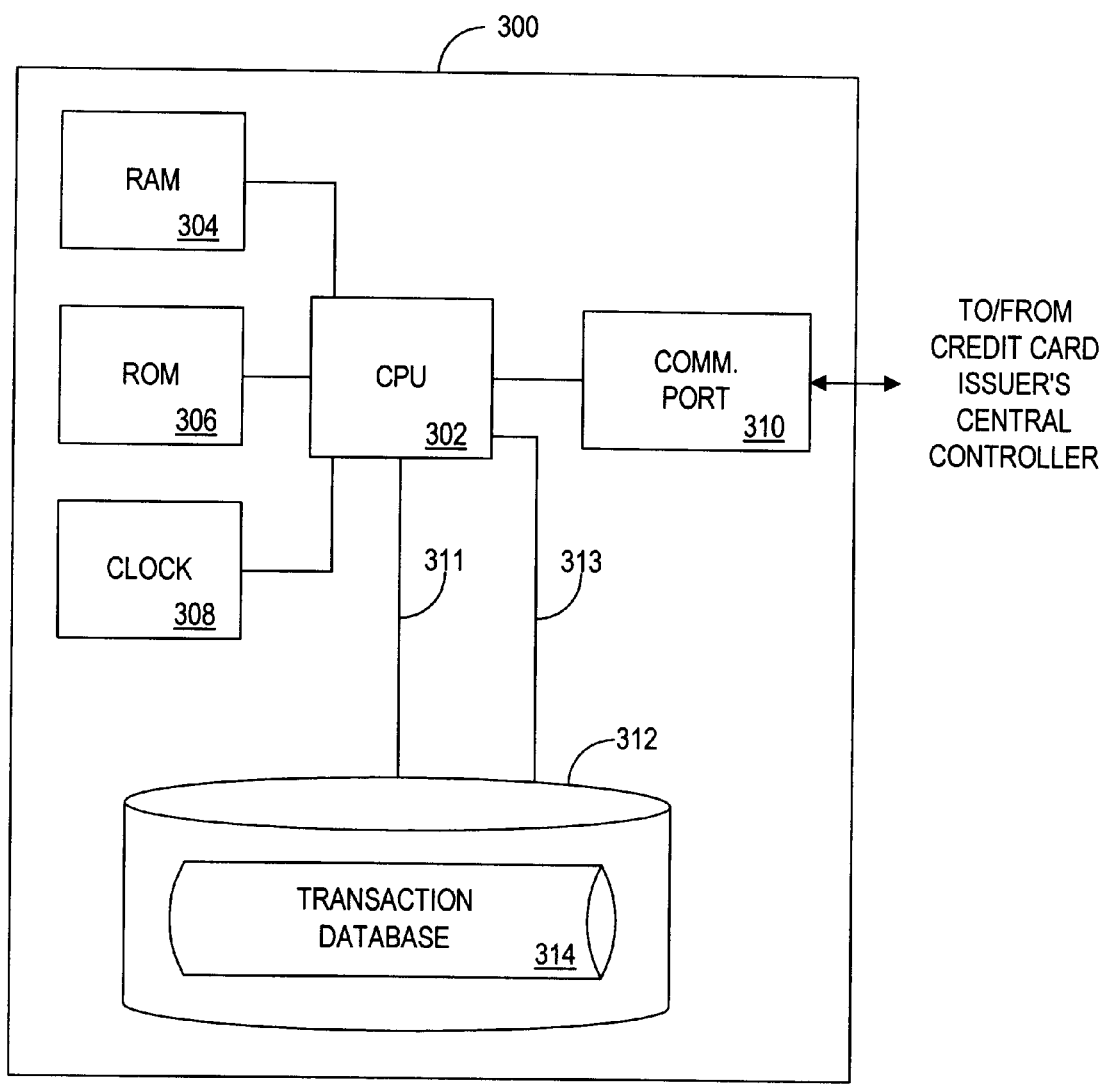
FIG. 3 is a block system diagram of a credit card processor's data processing system.

Referring now to FIG. 3, therein depicted is a block system diagram of credit card processor 110's data processing system In particular, data processing system 300 includes a computer system having a CPU 302, a RAM 304, a ROM 306, a CLOCK 308, a communications processor and port device 310 (hereinafter abbreviated as "COMM PORT 310"), and a data storage device 312 maintaining a database comprised of a transaction database 314. Additionally, the aforementioned components are operatively coupled in a conventional way via couplings 311 and 313. Couplings 311 and 313 may be a bus architecture, a network architecture or any other topology that allows high-speed data communications between CPU 302 and data storage device 312 which may be a fast, disk-based data storage device which are well known in the computer industry.

Like data processing system 200 (FIG. 2) data processing system 300 is depicted as a general purpose computer system such as one manufactured by SUN Microsystems known in the industry as the SUN SPARC processor (e.g., a SPARC 1000 running SUN SOLARIS). The database management system software "DBMS" is preferably implemented in a relational database environment such as one produced by ORACLE Corp. known in the industry as the ORACLE 7 relational database management system.

The use and operation of the component parts of data processing system 300 including the use and operation of CPU 302, RAM 304, ROM 306, CLOCK 308, COMM PORT 310, couplings 311 and 313, and data storage device 312 will be readily apparent to those skilled in the field of computers and the like.

The interconnections of the component parts making up data processing system 200 will be readily known in the art of computer system design and implementation. Moreover the use of a DBMS like ORACLE 7, including the maintenance, querying, and manipulation of databases and corresponding tables related to a system such as ORACLE 7, will be as readily understood by those skilled in the art of database management technologies.

The actual DBMS structure of the database forming the basis of tables utilized in the context of the present invention (i.e., table 314) will be discussed in detail below with regard to FIG. 7.

It should be noted that like COMM PORT 210 (FIG. 1), COMM PORT 310 is correspondingly configured to communicate via telecommunications links to a credit card issuer station such as credit card issuer 102 as depicted in FIG. 1. Electronic communications in the form of data communications will be readily apparent to those skilled in the art. Of course, it should be noted that COMM PORT 310 could be configured to communicate via a networking topology in an open standards environment or in a closed intra-net environment possibly utilizing conventional networking protocols such as TCP/IP and the like.

Referring now to FIG. 4, therein depicted is a diagram of a credit card account holder database 400 of the type illustrated in FIG. 2 and which is maintained at a credit card issuer's site as shown in FIG. 1. In particular, credit card account holder database 400 (hereinafter referred to as "table 400") comprises a database management system table that is preferably used in a relational arrangement whereby table 400 is related to other tables in the particular database management system by way of common columns or table fields. In any case, table 400 is maintained in data storage device 212 (FIG. 2) preferably as a one or more physical disk files stored at one or more credit card issuer sites. Table 400 has a field structure including fields CUSTOMER ACCOUNT NUMBER, NAME, ADDRESS, PHONE NUMBER, ORIGINAL CREDIT LINE, AVAILABLE CREDIT LINE, and CREDIT RATING. Of course, table 400's field structure is simplified here for purposes of brevity; in actual implementation, many more fields may be used to record other account holder information and to record system parameters related to particular records in the database table. The fields form the columns of table 400 and the data records form the rows of table 400. The layout of table 400, including its appearance in FIG. 4, will be readily appreciated by those skilled in the art of database management systems. It should be noted that the columns and their apparent arrangement in table 400 are merely exemplary to enable one skilled in the art to make and use the invention; no inferences should be drawn that the table structure (logically or physically) as shown is intended to limit the structure that is ultimately implemented.

It should also be noted that while table 400 (as well as the other tables mentioned below) show pecuniary amounts in terms of U.S. dollars, the invention and the present embodiment are not so limited. The present invention is adaptable to any form of currency and forms of money. U.S. dollars are shown and described merely to illustrate the invention and the present embodiment.

In terms of the data and information stored in table 400, two records are shown. A first record $R_1$ has been entered into the database management system and into table 400 to store data related to a credit card account holder named TONY CARDHOLDER who maintains the unique credit card and CUSTOMER ACCOUNT NUMBER 2222-3333-4444-5555. A second record $R_2$ has been entered into the database management system and into table 400 to store data related to a credit card account holder named SUE MARVIN who maintains the unique credit card and CUSTOMER ACCOUNT NUMBER 2222-8888-7777-6666.

In table 400, the account numbers for $R_1$ and $R_2$ are industry common sixteen (16) digit credit card account numbers. Accordingly, the first four (4) digits of each of the account numbers indicate the banking institution that issued the credit card accounts (i.e., the credit issuer). In this case the credit card issuer has a bank code of "2222." Thereafter, the remaining twelve (12) digits of each credit card account number are unique. As such, the sixteen (16) digit account number uniquely identifies a particular card holder account issued by a credit card issuer. Additionally, it is the sixteen (16) digit account number that card holders seek to protect from fraudulent use. Of course it should be understood that while a sixteen digit account number is common in the credit card field, other credit card number lengths are certainly envisioned by the present invention. In particular, the present invention would certainly be applicable to a credit card number such as those used by AMERICAN EXPRESS which have fifteen digits.

The field and columns not specifically mentioned above will be readily apparent to those skilled in the art of database design and implementation.

Referring now to FIG. 5, therein depicted is the certificates database as illustrated in FIG. 2 and which is maintained at a credit card issuer's site as shown in FIG. 1. The term "certificate" is mentioned here merely to illustrate an exemplary use of the redemption vouchers which are produced and processed according to the present embodiment. As such, certificates database 500 (hereinafter "table 500"), like table 400, has a column and row arrangement that may be physically stored as one or more data files in data storage device 212 (FIG. 2) at one or more credit card issuer sites. In terms of its logical structure, table 500 includes columns or fields intended to contain information related to CUSTOMER ACCOUNT NUMBERs, CERTIFICATE NUMBERs, MAXIMUM VALUEs attributable to a particular certificate or redemption voucher, and STATUS. The STATUS field is intended to store information related to the current system status related to a particular redemption voucher or certificate. For example a STATUS indication of "ISSUED" means that the corresponding certificate has been issued to its intended credit card account owner and that the certificate has not yet been presented to a merchant for redemption. It should be noted that the columns and their apparent arrangement in table 500 are merely exemplary to enable one skilled in the art to make and use the invention; no inferences should be drawn that the table structure (logically or physically) as shown is intended to limit the structure that is ultimately implemented.

Table 500 is shown as storing information about three certificates. A first certificate is maintained in table 500 at record $R_1$ and has a CERTIFICATE NUMBER of 2222-XXXX-XXXX-XXXX which corresponds and relates to CUSTOMER ACCOUNT NUMBER 2222-3333-4444-5555. A second certificate is maintained in table 500 at record $R_2$ and has a CERTIFICATE NUMBER of 2222-XXXX-XXXX-9999. A third certificate is maintained in table 500 at record $R_3$ and has a CERTIFICATE NUMBER of 2222-1111-1111-1111. Accordingly, table 500 shows that it is possible to have a one to many relationship between a unique account number and many redemption vouchers or certificates. All that is required is that table 500 or some derivative thereof be used during a clearing process to properly map or translate redemption voucher identifiers or CERTIFICATE NUMBERs to appropriate CUSTOMER ACCOUNT NUMBERS. As noted, two certificates (i.e., those stored at records $R_2$ and $R_3$, respectively) having different CERTIFICATE NUMBERs map and correspond to a single CUSTOMER ACCOUNT NUMBER. Additionally, as noted above in regard to FIG. 1, the certificate numbers found in table 500 are visually different from their corresponding unique credit card account numbers. Although the numbers listed in the table do not appear to be random in nature, random numbers (at least for the last 12 digits thereof —reading left to right—) are preferred.

Referring now to FIG. 6, therein depicted is the credit card issuer's transaction database as illustrated in FIG. 2 and which is maintained at a credit card issuer's site as shown in FIG. 1. Transaction database 600 (hereinafter "table 600"), like tables 400 and 500 has a column and row arrangement that may be stored as one or more physical data files in data storage device 212 (FIG. 2) at one or more credit card issuer sites. The intent behind table 600 is for credit card issuer 102 (FIG. 2) to record transaction information related to the processing and clearing of redemption vouchers within the redemption voucher processing system shown in FIG. 2. In particular, as transactions or requests to clear and authorize particular redemption vouchers are made upon credit card issuer 102 (FIG. 2), credit card issuer 102 will edit and/or update table 600. In particular, credit card issuer 102 will store information related to each transaction for purposes of later billing to appropriate credit card account holders in a conventional way. More particularly, credit card issuer will need to store information about each transaction including, but not limited to, ACCOUNT NUMBER, DATE, TIME, TRANSACTION ID NUMBER, AUTHORIZATION CODE, and TRANSACTION AMOUNT. The column or field labeled TRANSACTION ID NUMBER, in this embodiment, is used to store the redemption voucher identifier that formed the basis of the transaction entry in table 600. It should be noted that the columns and their apparent arrangement in table 600 are merely exemplary to enable one skilled in the art to make and use the invention; no inferences should be drawn that the table structure (logically or physically) as shown is intended to limit the structure that is ultimately implemented.

Table 600 is shown as storing information about two transactions. In particular, a first transaction is stored at record $R_1$ and a second transaction is stored at record $R_2$. Record $R_1$ relates to a transaction based on a redemption voucher or certificate having a redemption voucher identifier of 2222-XXXX-XXXX-XXXX which is stored in the TRANSACTION ID column. Record $R_2$ relates to a transaction based on a redemption voucher or certificate having a redemption voucher identifier of 2222-9898-2345-5473 which is stored in the TRANSACTION ID column. The dollar amount stored in each record in table 600 indicates that the exact amount charged to a corresponding credit card account based on a transaction having a specified value and wherein a redemption voucher was tendered as payment to cover that specified value. In this way, the invention allows redemption vouchers to be used to buy goods and services up to a specified maximum value. If the actual charge is less than the specified maximum value, the credit card customer is only charged for the transaction value without any loss of redemption voucher face value and without the store crediting excess redemption voucher face value to its own account as a "store credit."

Of course, it should be understood that the customer's account number will likely be a key field in Table 600.

Referring now to FIG. 7, therein depicted is the credit card processor's transaction database that is illustrated in FIG. 3 and which is maintained at a credit card processor's site as shown in FIG. 1. Transaction database 700 (hereinafter "table 700"), like tables 400, 500, and 600 has a column and row arrangement that may be stored in one or more physical data files in data storage device 312 at one or more credit card processor sites. Table 700 stores information related to merchant and transaction data including MERCHANT ID NUMBER, DATE (i.e., transaction date), TIME (i.e., transaction time), ACCOUNT NUMBER (after receipt of the same from a credit card issuer as discussed below), TRANSACTION AMOUNT, TRANSACTION ID NUMBER (i.e., a redemption voucher identifier possibly in the form of a certificate or gift certificate number), and an AUTHORIZATION NUMBER. It should be noted that the columns and their apparent arrangement in table 700 are merely exemplary to enable one skilled in the art to make and use the invention; no inferences should be drawn that the table structure (logically or physically) as shown is intended to limit the structure that is ultimately implemented.

In terms of the actual data stored in table 700, record $R_1$ indicates that a merchant having MERCHANT ID NUMBER 454838 was presented with redemption voucher having a redemption voucher identifier of 2222-XXXX-XXXX-XXXX (TRANSACTION ID NUMBER) on Apr. 15, 1997 at 11:00 AM in the context of a purchase transaction having a specified value or TRANSACTION AMOUNT of $47.59. Appropriate processing including, but not limited to, data communications between the credit card processor 108 (FIG. 1) and the credit card issuer 102 and a mapping or look-up of the redemption voucher identifier 2222-XXXX-XXXX-XXXX revealed that the redemption voucher was issued by credit card issuer 102 (FIG. 1) in relation to a credit card account having ACCOUNT NUMBER 2222-

3333-4444-5555 (which account number was ultimately received from the credit card issuer and stored in the transaction record of table 700). And, since credit card issuer 102 authorized the use of the redemption voucher, an approval code or AUTHORIZATION NUMBER of 2239 was stored in table 700. A similar discussion is omitted with regard to record $R_2$.

Although the actual processes by which the systems of the present invention are illustrated in the flow charts of FIGS. 9A, 9B, 11A, and 11B as discussed below, such processes are illustrated in the interrelationships of the data found in tables 400, 500, 600, and 700. For example, records $R_1$ in tables 400, 500, 600, and 700 illustrate such processes. That is, an account owner of CUSTOMER ACCOUNT NUMBER 2222-3333-4444-5555 having an AVAILABLE CREDIT LINE of $1,233.00 (FIG. 4) is force issued (i.e., unsolicited redemption voucher issuance by a credit card issuer) a bearer-type redemption voucher having a corresponding redemption voucher identifier or CERTIFICATE NUMBER of 2222-XXXX-XXXX-XXXX and a MAXIMUM VALUE of $50.00 (FIG. 5). The customer owning that credit card account having account number 2222-3333-4444-5555 subsequently provided that bearer-type redemption voucher to another person (possibly as a gift) who, in turn, presented the same to a merchant having a MERCHANT ID NUMBER of 454838 on Apr. 15, 1997 (FIG. 7) as payment in the context of a particular purchase transaction having a specified value for the goods and/or services that were purchased and that were authorized by credit card issuer by the recordation of an approval code or AUTHORIZATION NUMBER of 2239 (FIG. 7). And, in table 600 a transaction record is maintained in the credit card issuer's database management system to record and memorialize the fact that a redemption voucher was, in fact, used within the aforementioned purchase transaction and that the account owner having ACCOUNT NUMBER 2222-3333-4444-5555 (FIG. 6) was charged the specified value or TRANSACTION AMOUNT of $47.59. The account owner will see the $47.59 charge on his next account statement or bill.

Accordingly, based on the foregoing discussions, an account owner is less likely to transfer or jump from one credit card to another when he or she has issued outstanding redemption vouchers to other people. The credit card customer likely will wait until a charge corresponding to a redeemed redemption voucher appears on a future account statement or bill. Thus, the account owner is retained as a credit card holder and customer of a particular credit card issuer for a longer period of time thereby allowing the credit card issuer to realize greater services fees and the like.

Figure 8:
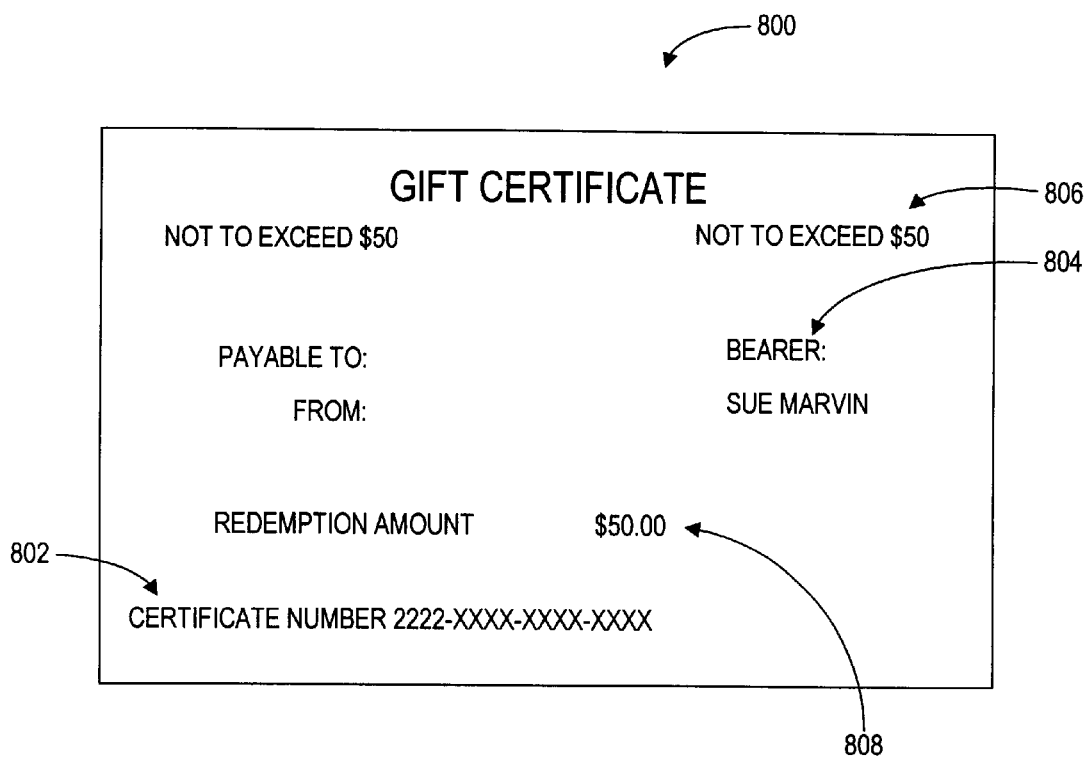
FIG. 8 is a depiction of a redemption voucher in the form of a gift certificate having a redemption voucher identifier and which is the type of redemption voucher contemplated by the system shown in FIG. 1.

Referring now to FIG. 8, therein depicted is a bearer-type redemption voucher of the type contemplated by the present embodiment and which is in the form of a gift certificate having a redemption voucher identifier according to a first embodiment of the present invention. Gift certificate 800 is a negotiable instrument by its possessor as it is "Payable to Bearer" as indicated at reference numeral 804, thus allowing gift certificate 800 to be freely transferred from an account owner (in this case SUE MARVIN—See Table 400—FIG. 4) to a recipient and, ultimately, to a merchant who can receive funds in relation thereto. Of course, any recipient or possessor of gift certificate 800 can tender the same in exchange for funds.

Gift certificate 800 has been printed by a high-speed laser printer device on card stock to appear important and valuable. The printing of gift certificate 800 is caused to occur by a credit card issuer such as by credit card issuer 102 (FIG. 1). Gift certificate 800 bears a pre-printed maximum value 806 but may be printed with a blank space indicator such as a line on which the credit card account owner may insert a desired maximum dollar or pecuniary value. Additionally, gift certificate 800 bears a redemption voucher identifier 802 in the form of a CERTIFICATE NUMBER of 2222-1111-1111-1111 which resembles a sixteen (16) digit credit card number, but which, in fact, is a corresponding alias credit card account number. There is no way for a person to visually inspect gift certificate 800 and redemption voucher identifier 802 to discern account owner SUE MARVIN's credit card account number. Such a mapping can only occur at a credit card issuer type facility like credit card issuer 102 (FIG. 1).

As shown in FIG. 8, gift certificate 800 was presented for redemption at a merchant during the context of a transaction having a specified value of at least $50.00 as evidenced by the point of sale indicia 808 of $50.00 placed next to the REDEMPTION AMOUNT and which may be register printed on gift certificate 800.

As part of a credit card account owner retention program run by a credit card issuer, gift certificate 800 will work to retain account owners. Specifically, by having the ability to safely distribute credit notes in the form of gift certificates to recipients of choice, a credit card account owner will increase his or her account balance and will have outstanding gift certificates thus possibly preventing the credit card account owner from closing his or her credit card account. This principle is analogous to a personal checking account in that one should not desire to close a checking account when he or she has outstanding unprocessed checks. Thus, credit card accounts and credit card customers will be retained by credit card issuers thereby allowing the latter to realize greater services fees for longer periods of time.

Additionally, by its very nature, giver certificate 800 provides a credit card customer with the highest level of instrument flexibility possible. A credit card customer can use gift certificate 800 himself or pass it along as a gift. Moreover, gift certificate 800 is processed as any other credit card transaction according to the present invention. Also, it should be noted that no store or merchant need be identified on gift certificate 800 since the intention of the present embodiment of the invention is to allow gift certificate to be used anywhere a credit card could or would be used.

Figure 9A:
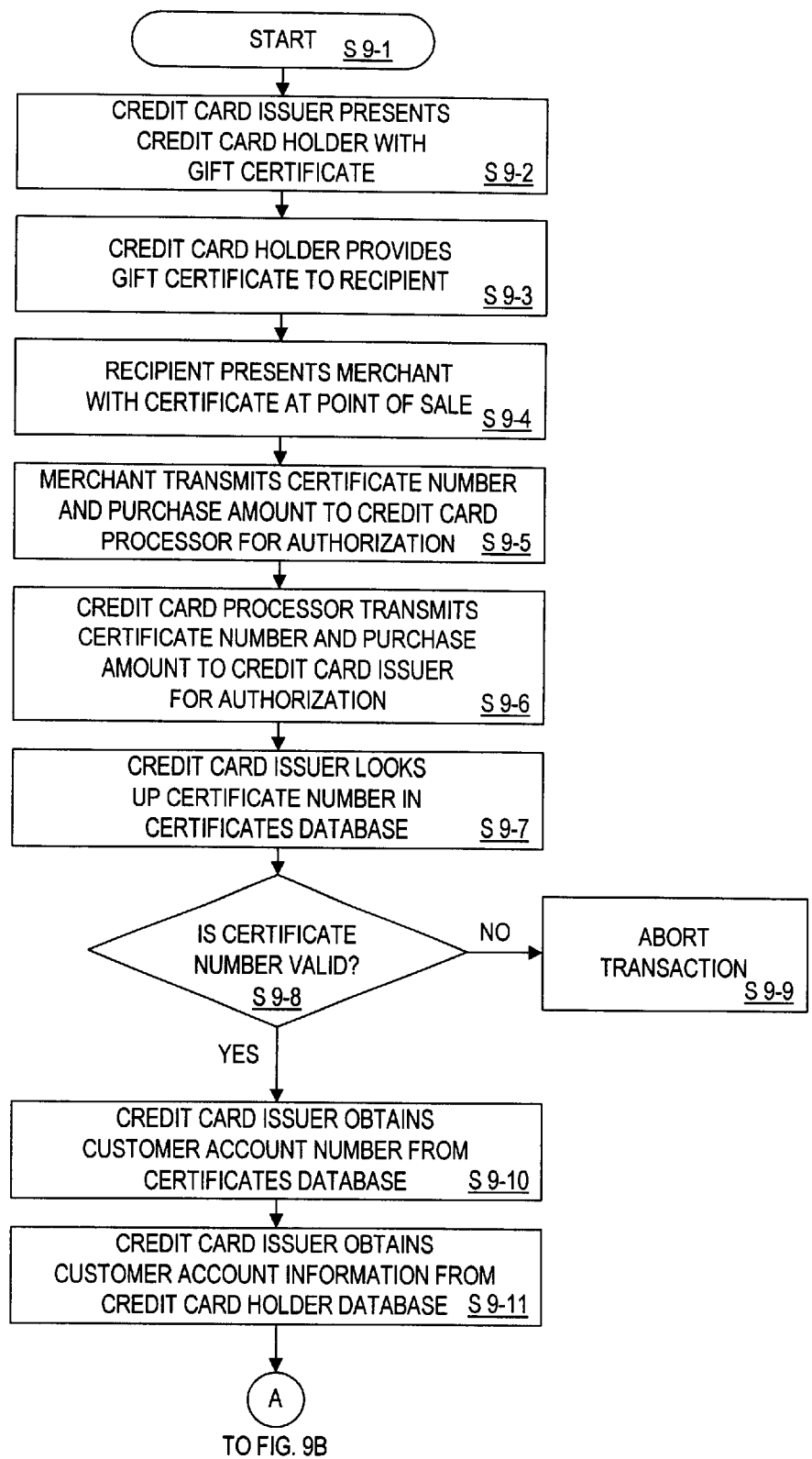
FIG. 9A is a flow chart illustrating the flow of information and corresponding processes carried out within the system shown in FIG. 1.
Figure 9B:
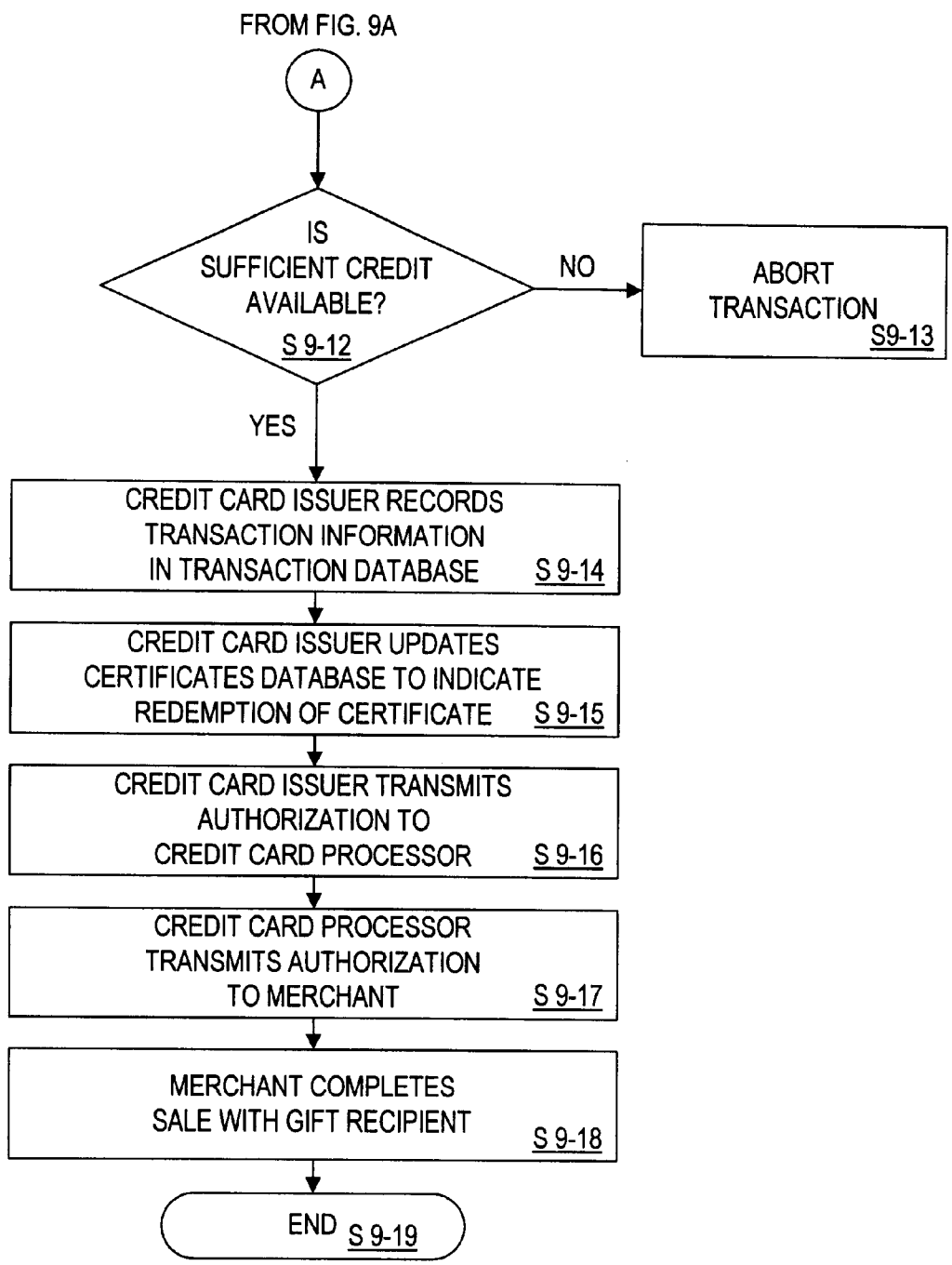
FIG. 9B is a continuation of the flow chart depicted in FIG. 9A.

Referring now to FIGS. 9A and 9B, therein depicted is a flow chart that illustrates the salient processes carried out within the system shown in FIG. 1 including the issuance and authorization processing of redemption vouchers. Many of the steps depicted in FIGS. 9A and 9B illustrate the sequence of operations carried out by the computers forming essential parts of the system shown in FIG. 1 including the credit card issuer's data processing system, the merchant's POS system, and the credit card processor's data processing system (e.g., the clearing house's data processing system). The computer programming necessary to carry out the functions stated below will be readily apparent to those skilled in the art of computer programming. The flow chart of FIGS. 9A and 9B along with the discussions of the same found herein are sufficient and adequate to enable one skilled in the art of computer programming to make and use the present invention.

Processing starts at Step S9-1 and immediately proceeds to Step S9-2 where a credit card issuer presents a credit card holder with a redemption voucher which may take the form of a bearer-type redemption voucher. Thereafter, processing proceeds to Step S9-3 where the credit card holder provides a gift certificate to a recipient of the credit card holder's choice. Next, at Step S9-4 the recipient presents the redemption voucher to a merchant at the point of sale. At Step S9-5, the merchant transmits the certificate number (i.e., the alias credit card account number) and the purchase or specified amount to a credit card processor or clearing house for authorization. At Step S9-6, the credit card processor transmits the certificate number and the purchase amount to the credit card issuer for authorization. At Step S9-7 the credit card issuer performs a database query such as a structured query implemented in a structured query language such as SQL to locate the certificate number in a certificates database (e.g., TABLE 5—FIG. 5). At Step S9-8, a determination is made as to whether the certificate number was in the database. If not, processing proceeds to Step S9-9 wherein the certificate number is held invalid and the transaction is aborted.

If the certificate number was found in the database at Step S9-8 processing proceeds to Step S9-10 where the credit card issuer obtains a customer account number corresponding to the alias certificate number in the gift certificate database (e.g., Table 5—FIG. 5). Next, processing proceeds to Step S9-11 where the credit card issuer obtains other customer account information from a credit card holder database (e.g., Table 4—FIG. 4).

Processing thereafter proceeds to Step S9-12 in FIG. 9B, where a determination is made as to whether sufficient credit is available to cover the purchase amount of the transaction. If not, the transaction is aborted at Step S9-13.

If sufficient credit is available, processing proceeds to Step S9-14 where the credit card issuer records transaction information in a transaction database maintained by the credit card issuer. Next, at Step S9-15, the credit card issuer edits and updates its certificates database to reflect the fact that the gift certificate has been redeemed. Thereafter, at Step S9-16, the credit card issuer transmits an authorization notification to the credit card processor. At Step S9-17, the credit card processor transmits an authorization approval notification to the merchant, who, at Step S9-18, completes the sale with the recipient and sends the recipient on his way.

Processing and flow ends at S9-19.

Figure 10:
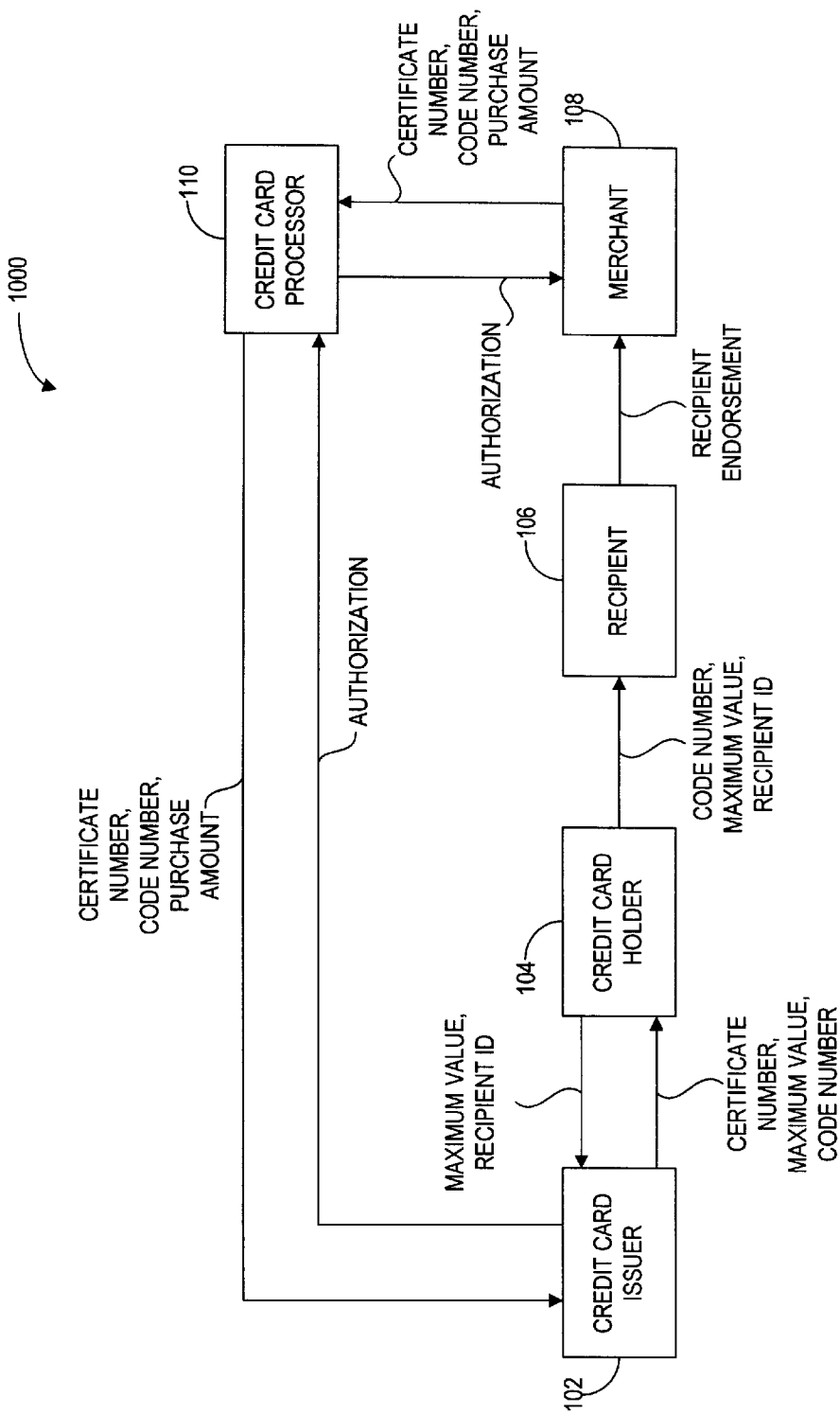
FIG. 10 is a block system diagram of a redemption voucher processing system according to a second embodiment of the present invention.

Referring now to FIG. 10, therein depicted is a diagram of a redemption voucher processing system according to a second embodiment of the present invention. The component parts of the system illustrated in FIG. 10 correspond to the component parts of FIG. 1 as indicated by the like reference numerals. Accordingly, for purposes of brevity a redundant discussion is omitted. However, the type of redemption voucher and the type and flow of certain information within system 1000 require further discussion.

Figure 12:
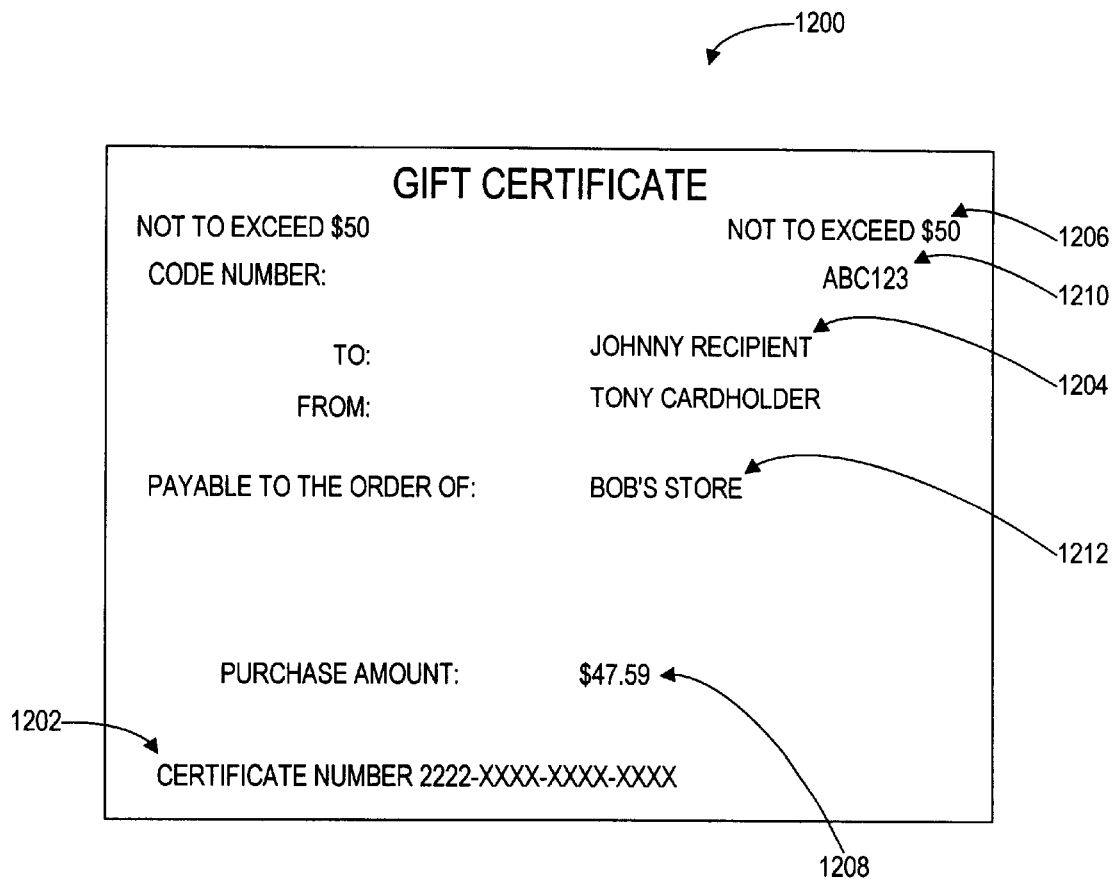
FIG. 12 is a depiction of a redemption voucher in the form of a gift certificate having a redemption voucher identifier and which is the type of redemption voucher contemplated by the system shown in FIG. 10.

The embodiment illustrated in FIG. 10 contemplates a redemption voucher that must be pre-authorized by the credit card account owner prior to voucher redemption. Such a redemption voucher is shown in FIG. 12 and is discussed in detail below. In the meantime, the redemption voucher is forced or submitted on request of credit card holder 104. Along with submission of the redemption voucher by credit card issuer 102 to credit card holder 104 is a certificate number or redemption voucher identifier that is an alias credit card account number of the type described above with reference to FIG. 8, for example.

Thereafter, at the discretion of credit card holder 104, credit card holder can choose to activate the redemption voucher by contacting credit card issuer 102 (usually via telephone through some sort of automated voice response system) and indicating to credit card issuer 102 desired certificate value limit (e.g., a maximum dollar value) and recipient indicia. Once activated within the data processing systems of credit card issuer 102 or within a special activation sub-system thereof, credit card issuer 102 will provide the credit card holder with a security code number or code identifier possibly including alpha and/or numeric data. The security code number further minimizes the risks associated with fraudulent use, but does add complexity to the redemption voucher use and distribution process. Of course, credit card issuer 102 may be caused to effectuate holds on credit for the AMOUNT specified by credit card holder 104.

If credit card holder 104 decides to present the activated redemption voucher to recipient 106, credit card holder 104 enters the security code number printed by credit card issuer 102 on the redemption voucher and distributes the redemption voucher to recipient 106.

Once the redemption voucher is presented to merchant 108 in the context of a transaction having a specified dollar value, merchant 108 will transmit the certificate number along with the security code number and the purchase amount to credit card processor or clearing house 110. Credit card processor will then re-transmit the certificate number, the security code number and the purchase amount to the credit card issuer where an authorization evaluation process similar to the process described in regard to FIG. I will commence.

Once authorized an authorization status notification will be transmitted by credit card issuer 102 to credit card processor and ultimately to merchant 108. Depending upon the status of the authorization notification (e.g., Approved or Declined), the merchant will either conclude the transaction or not accept the redemption voucher.

Figure 11A:
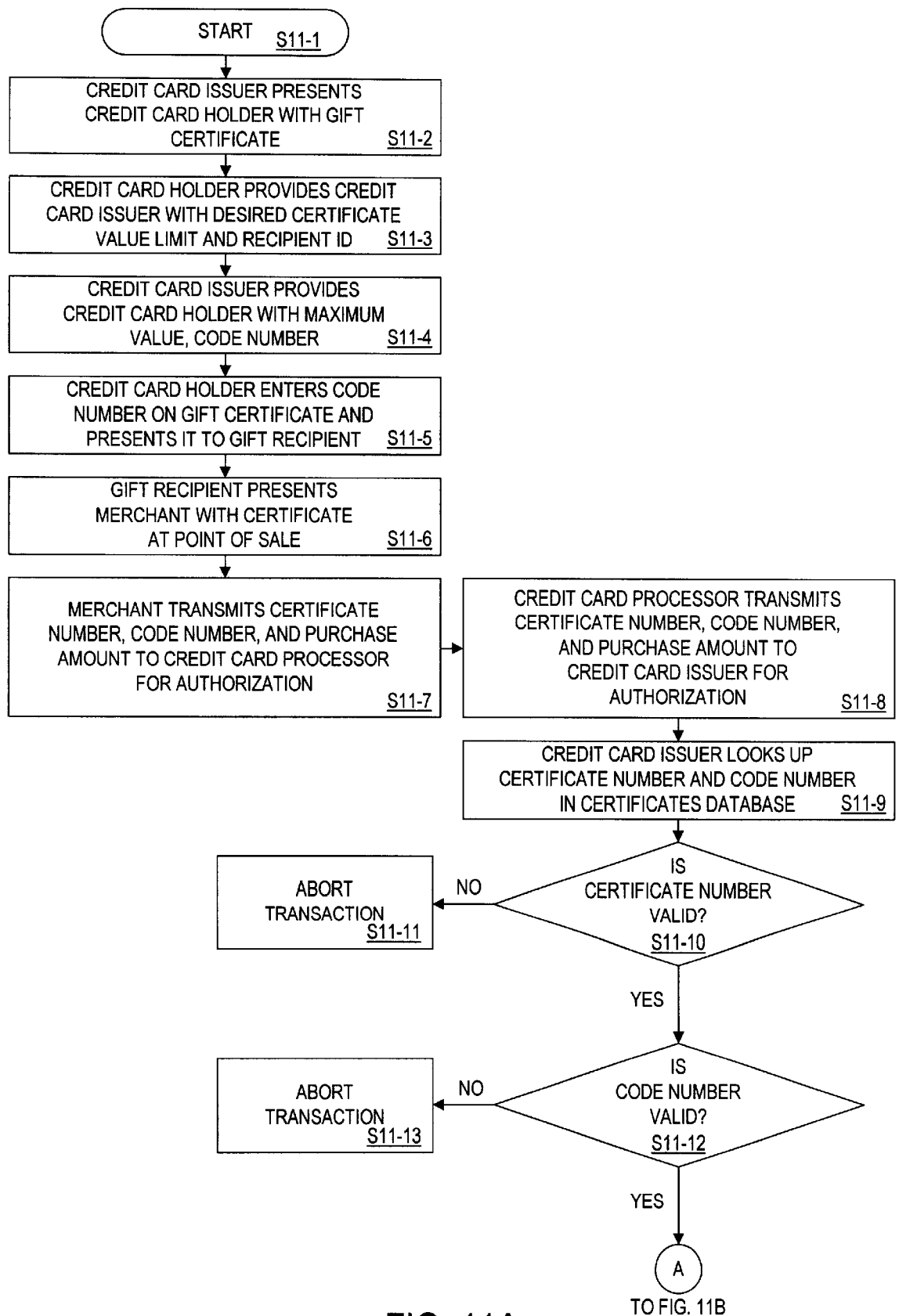
FIG. 11A is a flow chart illustrating the flow of information within the system shown in FIG. 10.
Figure 11B:
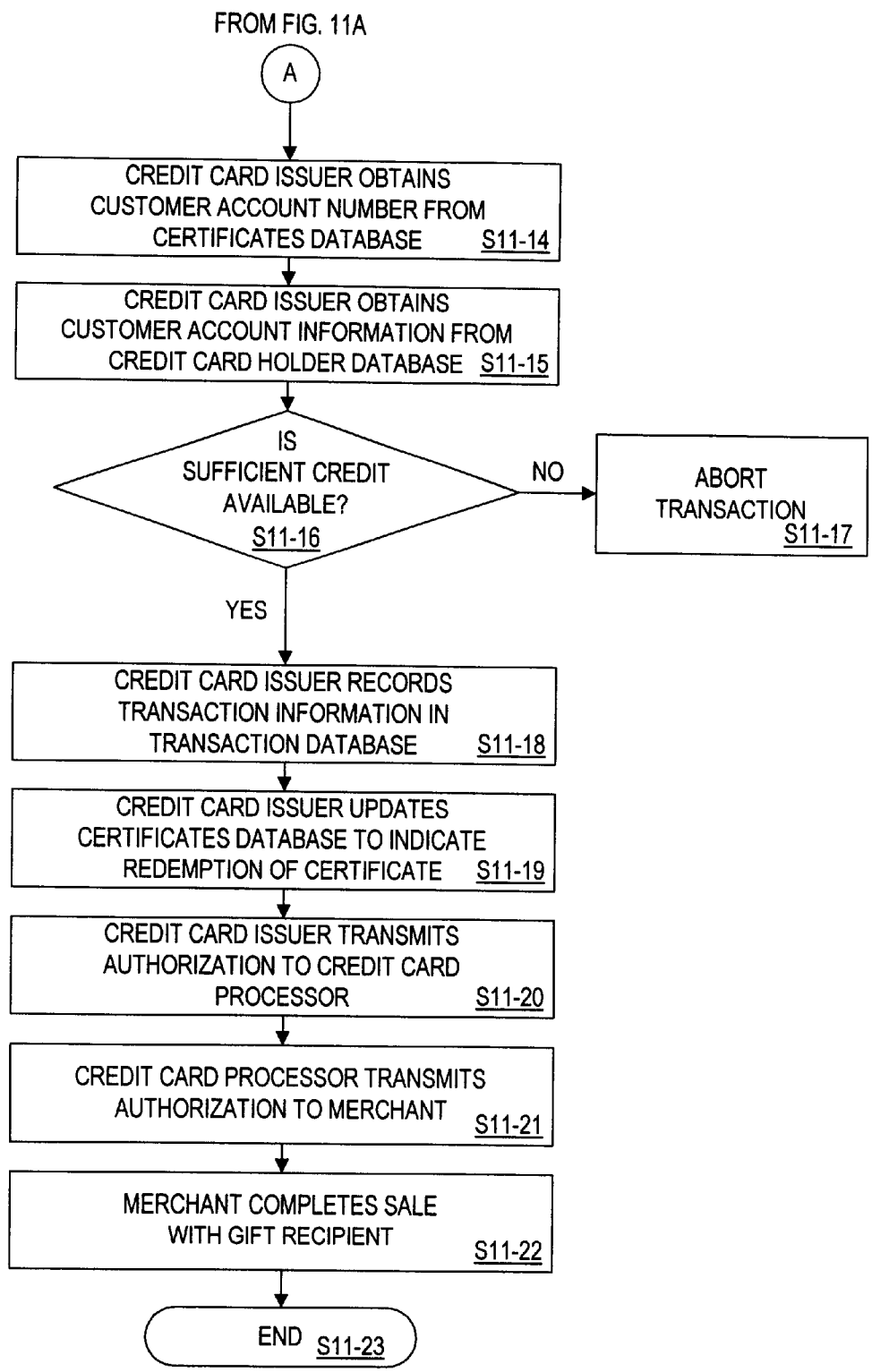
FIG. 11B is a continuation of the flow chart depicted in FIG. 11A.

Referring now to FIGS. 11A and 11B, therein depicted is a flow chart that illustrates the salient processes carried out within the system shown in FIG. 10 including the issuance and authorization processing of redemption vouchers. Many of the steps depicted in FIGS. 11A and 11B illustrate the sequence of operations carried out by the computers forming essential parts of the system shown in FIG. 10 including the credit card issuer's data processing system, the merchant's POS system, and the credit card processor's data processing system (e.g., the clearing house's data processing system). The computer programming necessary to carry out the functions stated below will be readily apparent to those skilled in the art of computer programming. The flow chart of FIGS. 11A and 11B along with the discussions of the same found herein are sufficient and adequate to enable one skilled in the art of computer programming to make and use the present invention.

Processing starts at Step S11-1 and immediately proceeds to Step S11-2 where the credit card issuer presents the credit card holder with a redemption voucher possibly in the form of a gift certificate having a certificate number which is an alias credit card account number. Thereafter, flow and processing proceed to Step S11-3 where the credit card holder provides the credit card issuer with a desired certificate value limit (e.g., a maximum dollar value) and recipient indicia such as a recipient's name or telephone number. Next, at Step S11-4, the credit card issuer provides the credit card holder with a security code number which may include alpha and numeric data.

At Step S11-5, the credit card holder enters the security code number on the gift certificate and presents the gift certificate to the recipient. Thereafter, at Step S11-6, the recipient can present the gift certificate to a merchant at the point of sale. Next, at Step S11-7, the merchant transmits the certificate number, the code number, and the purchase amount to the credit card processor for authorization. At Step S11-8, the credit card processor transmits the certificate number, the code numbers, and the purchase amount to the credit card issuer for authorization processing. At Step S11-9, the credit card issuer looks up the certificate number and the code number in the certificates database.

Flow and processing then proceed to Step S11-10 where a determination is made as to whether the gift certificate number is valid (i.e., is the certificate number in the certificates database?). If not, flow and processing proceed to Step S11-11 where the gift certificate is held to be invalid and the transaction is aborted with appropriate notification to the merchant.

If the gift certificate number was determined to be valid, a determination is made at Step S11-12 to determine if the code number is valid (i.e., does the code number in the certificates database correspond to the gift certificate?). If not, flow and processing proceed to Step S11-13 where the gift certificate is held to be invalid and the transaction is aborted with appropriate notification to the merchant.

If the code number was determined to be valid, processing proceeds to Step S11-14 in FIG. 11B. There, the credit card issuer obtains the customer account number from the certificates database.

Next, at Step S11-15, the credit card issuer obtains other customer account information from the credit card holder database based on the customer account number retrieved from the certificates database. At Step S11-16 a determination is made as to whether there is sufficient credit available to cover the purchase amount. If not, processing proceeds to Step S11-17 where the transaction is aborted with appropriate notification to the merchant. Of course, if the gift certificate were to specify a maximum value, an added determination step could be added to test whether the specified amount is fully covered by the maximum value and, if not, an appropriate message could be recorded and sent to the credit card processor.

If there is sufficient credit available to cover the purchase amount, processing and flow proceed to Step S11-18, where the credit card issuer records transaction information in a transaction database. At Step S11-19, the credit card issuer updates and edits the certificates database to indicate that the redemption voucher was redeemed.

Next, at Step S11-20, the credit card issuer transmits an authorization notification to the credit card processor. Thereafter, at Step S11-21, a corresponding authorization notification is transmitted from the credit card processor to the merchant who, in turn, completes the sale with the recipient and sends the recipient on his or her way at Step S11-22.

Processing ends at Step S11-23.

The structure and operation of the second embodiment of the present invention as above-described contemplates a redemption voucher of the type depicted in FIG. 12 to which reference is now made. Redemption voucher 1200 is shown as being a gift certificate having a certificate number which is a sixteen (16) digit alias credit card account number to be processed within a credit card account number processing system. Redemption voucher 1200 is a printed form also including a recipient identification (e.g., the handwritten name "JOHNNY RECIPIENT") which is completed or filled-in by the account owner TONY CARDHOLDER, a maximum value amount 1206, an actual purchase amount or a specified valued based on a particular transaction, and a code number supplied by a credit card issuer. Unlike redemption voucher 800 (FIG. 8), redemption voucher is not a bearer instrument that is intended to be redeemed by any possessor of the instrument. Instead, redemption voucher 1200 is intended to be a carefully controlled gift certificate for a designated recipient of the credit card holder's choice and, in this case, for a particular store 1212.

The particular store identifier 1212 may be selected by the credit card issuer based on a database of stores or merchants requesting that gift certificates to their stores be issued to credit card holders during a marketing campaign or the like. Additionally, the particular merchant designated at store identifier 1212 may be determined by the credit card issuer based on the credit card holder's past purchasing activities or based on a selection choice of the credit card holder which is based on the credit card holder's specific knowledge of the recipient's favorite merchants, product desires, etc. Additionally, a credit card issuer such as credit card issuer 102 could query a credit card processor such as credit card processor 110 to determine the particular stores and outlets that a credit card holder has previously patronized and issue corresponding redemption vouchers. In this way, merchants will likely support the redemption voucher program as they can look for further follow-on business and the like.

In any event, gift certificate 1200 becomes a valid negotiable instrument after it has been activated by the credit card holder and after a recipient and a code number are indicated on the gift certificate itself. As only the credit card holder knows the code number supplied by the credit card issuer, the card holder is assured that fraudulent use of the gift certificate is minimized. Additionally, like gift certificate 800, gift certificate 1200 can be imprinted by a register printer with a purchase amount to indicate the exact charge that will appear on the credit card holder's charge account statement or bill.

The alias nature of the industry common sixteen (16) digit certificate number allows the gift certificate to be provided to a recipient without fear of publishing the credit card holder's card account number. No visual inspection of gift certificate 1200 will reveal the card holder's credit card account number.

Like all of the redemption vouchers described herein, gift certificate 1200 can form the basis of a credit card customer retention program. In particular, by providing a credit card customer with the ability to issue what are in effect open lines of credit guaranteed by the credit card customer, the credit card customer is less likely to jump or transfer to another credit card and credit card issuer when a particular gift certificate or redemption voucher remains outstanding. Closing an account prior to redemption of an outstanding redemption voucher could cause embarrassment to the credit card holder and the recipient of the redemption voucher which can be avoided by maintaining the credit card account and not moving to another issuer's card.

Figure 13:
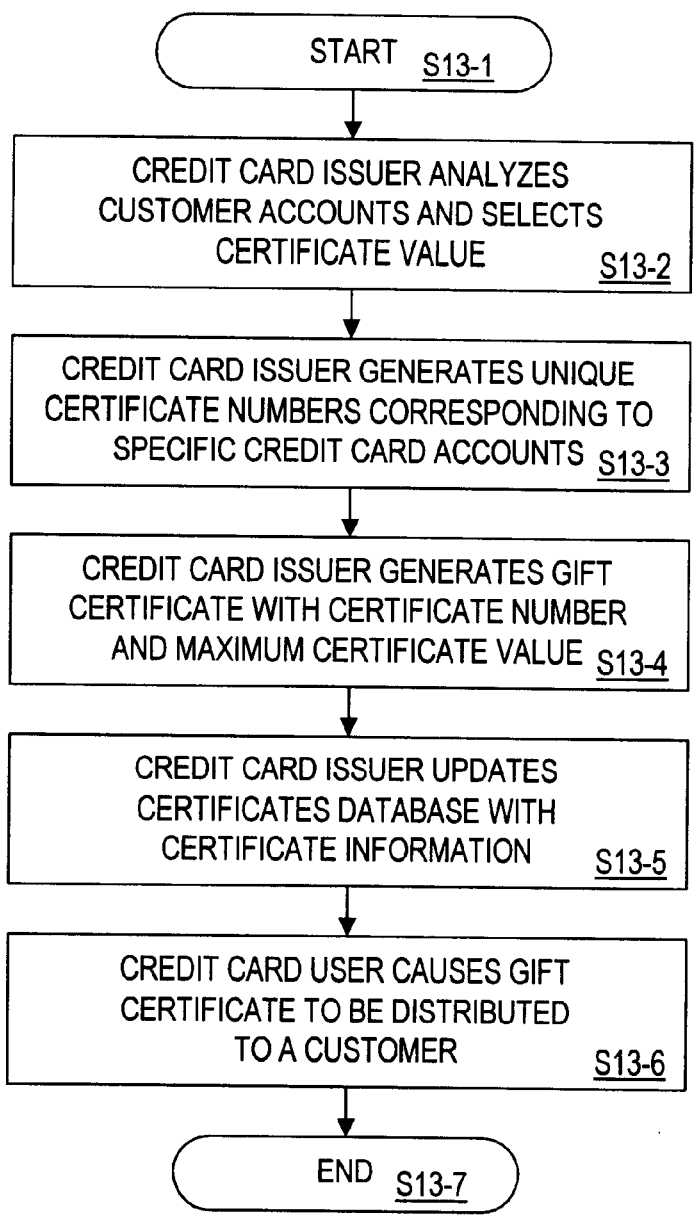
FIG. 13 is a flow chart illustrating the process of generating redemption vouchers having redemption voucher identifiers.

With regard to the last sheet of drawing figures, reference is now made to FIG. 13. Therein depicted is a flow chart that illustrates the salient steps of a preferred process for generating and issuing redemption vouchers to credit card account customers. Many of the steps depicted in FIG. 13 illustrate the sequence of operations carried out by a data processing system maintained by a credit card issuer. The computer programming necessary to carry out the functions stated below will be readily apparent to those skilled in the art of computer programming. The flow chart of FIG. 13 along with the discussions of the same found herein are sufficient and adequate to enable one skilled in the art of computer programming to make and use the present invention.

Processing starts at Step S13-1 and immediately proceeds to Step S13-2 where a credit card issuer analyzes customer accounts and selects corresponding certificate values based on a set of parameters including, but not limited to, credit worthiness, available credit, etc. Next, at Step S13-3, the credit card issuer generates certificate numbers which are alias credit card numbers that correspond to credit card account owners' credit card account numbers as described in regard to FIG. 1, for example.

At Step S13-5, the credit card issuer produces gift certificates including certificate numbers and maximum certificate values. Thereafter, the credit card issuer updates a certificates database with specific gift certificate information. The gift certiciates are preferably single part, printed forms (e.g., paper card-stock forms) that are produced to appear valuable and important.

Finally, at Step S13-6, the credit card issuer causes gift certificates to be distributed to customers regardless of whether the customers have requested such gift certificates or not. Distribution preferably takes place via conventional mail service along with credit card monthly account statements prepared and delivered by credit card issuers.

Processing ends at Step S13-7.

Having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A process for handling a redemption voucher, comprising the steps of:
   identifying an account having an account owner and an account identifier;
   generating a redemption voucher identifier corresponding to said account identifier;
   producing a redemption voucher including said redemption voucher identifier;
   distributing said redemption voucher to said account owner, said redemption voucher being immediately negotiable upon receipt by said account owner; and
   redeeming said redemption voucher, said redeeming step including determining whether said account has available credit to cover redemption of said redemption voucher;
   said account identifier not being present on said redemption voucher.

2. The process according to claim 1, wherein said identifying step and said generating step are carried out within a data processing system having an account database maintaining data related to said account owner and said account identifier.

3. The process according to claim 1, wherein said producing step is carried out by a printing device and said redemption voucher is a paper form on which said redemption voucher identifier is printed.

4. The process according to claim 3, wherein said printing device is a laser printer.

5. The process according to claim 1, wherein said redemption voucher is a gift certificate.

6. The process according to claim 1, wherein said producing step further comprises the inclusion of a maximum redemption value to be associated with said redemption voucher.

7. The process according to claim 6, wherein said maximum redemption value is a maximum dollar value.

8. The process according to claim 1, wherein said redemption voucher identifier includes a portion of said account identifier.

9. The process according to claim 1, wherein said distributing step comprises the submission of said redemption voucher to said account owner via a mail service.

10. The process according to claim 1, wherein said account identifier is a credit card account number including a unique set of numbers and said redemption voucher identifier includes a group of numbers matching a sub-set of said unique set of numbers of said credit card account number.

11. The process according to claim 1, wherein said account identifier is a unique credit card account number and said redemption voucher identifier includes a unique sequence of numbers.

12. The process according to claim 1 wherein said generating step includes generating said redemption voucher identifier in a format that is useable by a credit card processor.

13. A process for handling a redemption voucher, comprising the steps of:
   identifying an account within a data processing system, said account having an account owner and an account identifier;
   generating a redemption voucher identifier corresponding to said account identifier;
   producing a redemption voucher including said redemption voucher identifier;
   distributing said redemption voucher to said account owner, said redemption voucher for activation by said account owner within said data processing system prior to redemption; and
   redeeming said redemption voucher, said redeeming step including determining whether said account has available credit to cover redemption of said redemption voucher.

14. The process according to claim 13, wherein said identifying step and said generating step are carried out within a data processing system having an account database maintaining data related to said account owner and said account identifier.

15. The process according to claim 13, wherein said producing step is carried out by a printing device and said redemption voucher is a paper form on which said redemption voucher identifier is printed.

16. The process according to claim 15, wherein said printing device is a laser printer unit.

17. The process according to claim 13, wherein said redemption voucher is a gift certificate.

18. The process according to claim 13, wherein said producing step further comprises the inclusion of a maximum redemption value to be associated with said redemption voucher.

19. The process according to claim 18, wherein said maximum redemption value is a maximum dollar value.

20. The process according to claim 13, wherein said redemption voucher identifier includes a portion of said account identifier.

21. The process according to claim 13, wherein said distributing step comprises the submission of said redemption voucher to said account owner via a mail service.

22. The process according to claim 13, wherein said account identifier is a credit card account number including a unique set of numbers and said redemption voucher identifier includes a group of numbers matching a sub-set of said unique set of numbers of said credit card account number.

23. The process according to claim 13, wherein said account identifier is a unique credit card account number and said redemption voucher identifier includes a unique sequence of numbers.

24. The process according to claim 13, wherein said generating step includes generating said redemption voucher identifier in a format that is useable by a credit card processor.

25. A system for handling a redemption voucher comprising:
- a data processing sub-system maintaining a database of information related to an account having an account identifier and an account owner and generating a redemption voucher identifier corresponding to said account identifier;
- a production sub-system producing a redemption voucher including said redemption voucher identifier, said account identifier not being present on said redemption voucher;
- a distribution sub-system distributing said redemption voucher to said account owner, said redemption voucher being immediately negotiable upon receipt by said account owner; and
- a redemption sub-system redeeming said redemption voucher and determining whether said account has available credit to cover redemption of said redemption voucher.

26. The system according to claim 25, wherein said data processing sub-system is a general purpose computing system and said production sub-system includes a laser printing device.

27. The system according to claim 25, wherein said redemption voucher is a paper form having said redemption voucher identifier printed thereon.

28. The system according to claim 25, wherein said redemption voucher is a gift certificate.

29. The system according to claim 25, wherein said account identifier is a credit card number including a set of numbers and said redemption voucher identifier includes a sub-set of numbers equal to a sub-set of said set of numbers of said credit card number.

30. The system according to claim 25, wherein said account identifier and said redemption voucher identifier are unique sets of numbers.

31. The system according to claim 25, wherein said account identifier comprises a format useable by a credit card processor.

32. The system according to claim 25, wherein said redemption voucher includes a maximum value designator.

33. The system according to claim 32, wherein said maximum value designator is adapted to be set by said account owner.

34. The system according to claim 25, wherein said redemption voucher includes a merchant designator.

35. The system according to claim 33, wherein said merchant designator is adapted to be set by said account owner.

36. A system for handling a redemption voucher comprising:
- a data processing sub-system maintaining a database of information related to an account having an account identifier and an account owner and generating a redemption voucher identifier corresponding to said account identifier;
- a production sub-system producing a redemption voucher including said redemption voucher identifier, said redemption voucher for activation within said data processing system by said account owner prior to redemption of said redemption voucher;
- a distribution sub-system distributing said redemption voucher to said account owner; and
- a redemption sub-system redeeming said redemption voucher and determining whether said account has available credit to cover redemption of said redemption voucher.

37. The system according to claim 36, wherein said data processing sub-system is a general purpose computing system and said production sub-system includes a laser printing device.

38. The system according to claim 36, wherein said redemption voucher is a paper form having said redemption voucher identifier printed thereon.

39. The system according to claim 36, wherein said redemption voucher is a gift certificate.

40. The system according to claim 36, wherein said account identifier is a credit card number including a set of numbers and said redemption voucher identifier includes a sub-set of numbers equal to a sub-set of said set of numbers of said credit card number.

41. The system according to claim 36, wherein said account identifier is a unique credit card number and said redemption voucher identifier includes a unique sequence of numbers.

42. The system according to claim 36, wherein said account identifier comprises a format useable by a credit card processor.

43. The system according to claim 36, wherein said redemption voucher includes a maximum value designator.

44. The system according to claim 43, wherein said maximum value designator is adapted to be set by said account owner.

45. The system according to claim 36, wherein said redemption voucher includes a merchant designator.

46. The system according to claim 45, wherein said merchant designator is adapted to be set by said account owner.

47. A process for handling redemption vouchers, comprising the steps of:
- analyzing a database including information related to an account having an account owner and an account identifier;
- determining a redemption value based on an analysis of said information conducted during said analyzing step;
- establishing a redemption voucher identifier to correspond to said account identifier;
- producing a redemption voucher including said redemption voucher identifier and said redemption value, said account identifier not being present on said redemption voucher;
- updating said database based on said redemption voucher identifier and said redemption value;
- issuing said redemption voucher to said account owner; and
- redeeming said redemption voucher, said redeeming step including determining whether said account has available credit to cover redemption of said redemption voucher.

48. The process according to claim 47, wherein said producing step is carried out by a laser printing device and said redemption voucher is a paper form.

49. The process according to claim 47, wherein said redemption voucher is negotiable upon receipt by said account owner.

50. The process according to claim 47, wherein said account is a credit card account and said account identifier is a credit card number.

51. The process according to claim 50, wherein said analyzing step includes the analysis of the credit worthiness of said credit card account.

52. The process according to claim 47, wherein said redemption value is a maximum redemption value.

53. The process according to claim 47, wherein said issuing step includes mailing said redemption voucher to said account.

54. The process according to claim 47, wherein said database comprises an account table maintaining data related said account, a redemption voucher table maintaining data related to said redemption voucher including said redemption voucher identifier and said redemption value.

55. The process according to claim 54, wherein said updating step includes storing said redemption voucher identifier and said redemption value in said redemption voucher table.

56. The process according to claim 47, wherein said account is a debit card account and said account identifier is a debit card number.

* * * * *